US011532096B2

United States Patent
Magistri et al.

(10) Patent No.: US 11,532,096 B2
(45) Date of Patent: Dec. 20, 2022

(54) SYSTEMS AND METHODS FOR UTILIZING A DEEP LEARNING MODEL TO DETERMINE VEHICLE VIEWPOINT ESTIMATIONS

(71) Applicant: Verizon Connect Development Limited, Dublin (IE)

(72) Inventors: Simone Magistri, San Casciano in Val di Pesa (IT); Francesco Sambo, Florence (IT); Douglas Coimbra de Andrade, Florence (IT); Fabio Schoen, Florence (IT); Matteo Simoncini, Pistoia (IT); Luca Bravi, Scandicci (IT); Stefano Caprasecca, Florence (IT); Luca Kubin, Collecchio (IT); Leonardo Taccari, Florence (IT)

(73) Assignee: Verizon Connect Development Limited, Dublin (IE)

( * ) Notice: Subject to any disclaimer, the term of this patent is extended or adjusted under 35 U.S.C. 154(b) by 179 days.

(21) Appl. No.: 17/001,166

(22) Filed: Aug. 24, 2020

(65) Prior Publication Data

US 2021/0366144 A1 Nov. 25, 2021

(30) Foreign Application Priority Data

May 21, 2020 (IT) .......................... 102020000011875

(51) Int. Cl.
*G06T 7/70* (2017.01)
*G06N 3/08* (2006.01)
*G06V 20/56* (2022.01)

(52) U.S. Cl.
CPC .................. *G06T 7/70* (2017.01); *G06N 3/08* (2013.01); *G06V 20/56* (2022.01);
(Continued)

(58) Field of Classification Search
None
See application file for complete search history.

(56) References Cited

U.S. PATENT DOCUMENTS

| 8,483,447 | B1 * | 7/2013 | Arfvidsson ........ G01C 21/3673 382/113 |
| 10,304,191 | B1 | 5/2019 | Mousavian et al. |

(Continued)

OTHER PUBLICATIONS

Huang et al ("Bridging the Gap Between Detection and Tracking: A Unified Approach", Proceedings of the IEEE/CVF International Conference on Computer Vision (ICCV), 2019, pp. 3999-4009). (Year: 2019).*
Divon, Gilad et al., "Viewpoint Estimation|Insights & Model," Jul. 2018, The Technion, Israel, 17 pages.
Massa, Francisco et al., "Crafting a Multi-task CNN for Viewpoint Estimation," Sep. 2016, Champs-sur-Marne, France, 12 pages.
(Continued)

*Primary Examiner* — Leon Viet Q Nguyen

(57) ABSTRACT

A device may receive a first image. The device may process the first image to identify an object in the first image and a location of the object within the first image. The device may extract a second image from the first image based on the location of the object within the first image. The device may process the second image to determine at least one of a coarse-grained viewpoint estimate or a fine-grained viewpoint estimate associated with the object. The device may determine an object viewpoint associated with the second vehicle based on the at least one of the coarse-grained viewpoint estimate or the fine-grained viewpoint estimate. The device may perform one or more actions based on the object viewpoint.

20 Claims, 16 Drawing Sheets

(52) U.S. Cl.
CPC .............. *G06T 2207/20076* (2013.01); *G06T 2207/20081* (2013.01); *G06T 2207/20084* (2013.01); *G06T 2207/30252* (2013.01)

(56) References Cited

U.S. PATENT DOCUMENTS

| | | | |
|---|---|---|---|
| 2017/0286782 A1* | 10/2017 | Pillai | B60W 40/08 |
| 2017/0287170 A1* | 10/2017 | Perona | G06V 20/10 |
| 2019/0096086 A1 | 3/2019 | Xu et al. | |
| 2019/0220675 A1* | 7/2019 | Guo | G06V 20/56 |
| 2019/0220992 A1* | 7/2019 | Li | G06N 3/0454 |
| 2020/0005480 A1* | 1/2020 | Murase | G06K 9/00523 |

OTHER PUBLICATIONS

Chen, et al., "Learning Oriented Region-based Convolutional Neural Networks for Building Detection in Satellite Remote Sensing Images", The International Archives of the Photogrammetry, Remote Sensing and Spatial Information Sciences, vol. XLII-1/W1,2017 ISPRS Hannover Workshop: HRIGI 17—CMRT 17—ISA 17—EuroCOW 17, Jun. 6-9, 2017, Hannover, Germany.

Deng, et al., "Toward Fast and Accurate Vehicle Detection in Aerial linages Using Coupled Region-Based Convolutional Neural Networks", IEEE Journal of Selected Topics in Applied Earth Observations and Remote Sensing, vol. 10, No. 8, Aug. 1, 2017, pp. 3652-3664.

* cited by examiner

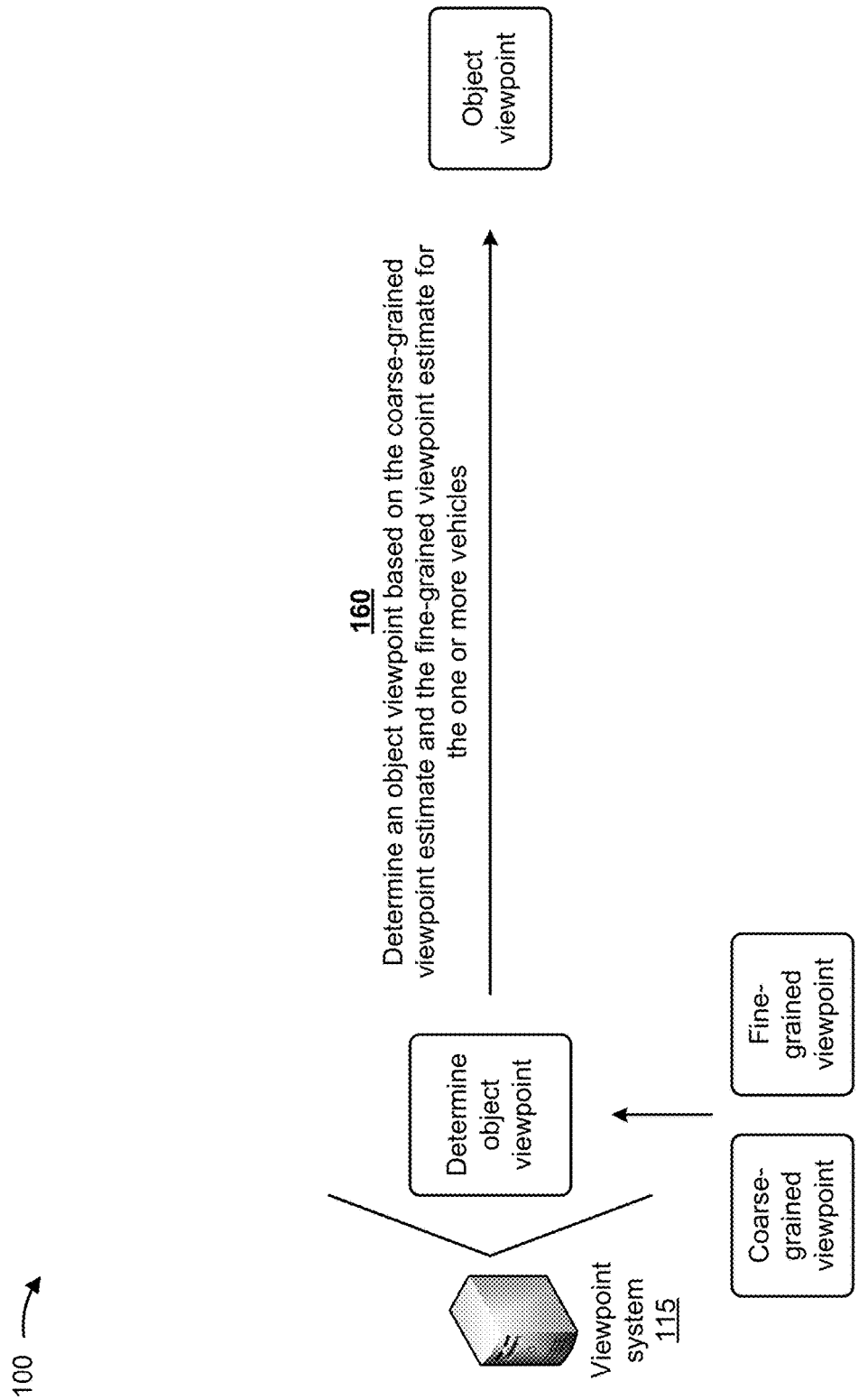

SYSTEMS AND METHODS FOR UTILIZING A DEEP LEARNING MODEL TO DETERMINE VEHICLE VIEWPOINT ESTIMATIONS

CROSS-REFERENCE TO RELATED APPLICATION

This application claims priority to Italian Application No. 102020000011875, filed on May 21, 2020, entitled "SYSTEMS AND METHODS FOR UTILIZING A DEEP LEARNING MODEL TO DETERMINE VEHICLE VIEWPOINT ESTIMATIONS," which is hereby expressly incorporated by reference herein.

BACKGROUND

An autonomous driving system may utilize road scene understanding to perform one or more actions associated with controlling an operation of a vehicle.

BRIEF DESCRIPTION OF THE DRAWINGS

FIGS. 1A-1K are diagrams of one or more example implementations described herein.

DETAILED DESCRIPTION OF PREFERRED EMBODIMENTS

Figure 1A:
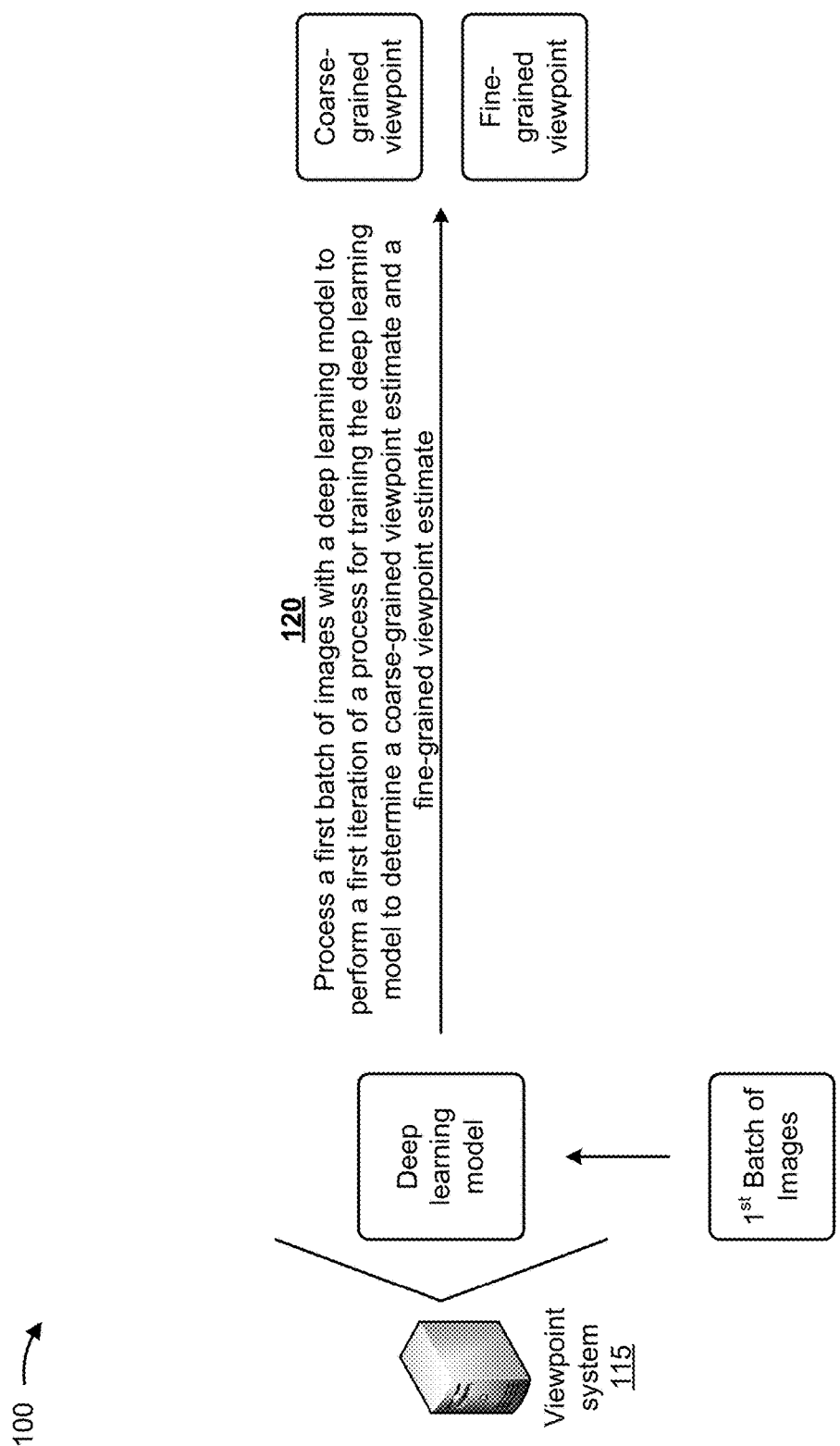

The following detailed description of example implementations refers to the accompanying drawings. The same reference numbers in different drawings may identify the same or similar elements.

A vehicle may include an autonomous driving system that is configured to perform one or more actions associated with an operation of the vehicle as the vehicle travels along a roadway, along a trail, in the air, through the water, and/or the like. For example, the autonomous driving system may analyze image data obtained by a camera to identify an object located in a path of the vehicle and to determine a direction that the object is facing. The autonomous driving system may perform an action based on identifying the object and based on determining the direction that the object is facing, such as providing a warning to a driver of the vehicle, causing the vehicle to slow down or stop, causing the vehicle to perform a maneuver to avoid the object, and/or the like.

The determined action may be different depending on the direction that the object is facing. For example, the autonomous driving system may determine to perform a first action if the object is facing in the same direction as the vehicle (e.g., cause the vehicle to slow down, cause the vehicle to maintain a current speed, cause the vehicle to swerve around the object, and/or the like) and may perform a different, second action if the object is facing towards the vehicle (e.g., cause the vehicle to stop, issue a warning to the driver, and/or the like).

Because the autonomous driving system may determine to perform different actions depending on the direction that the object is facing, the autonomous driving system may ensure that an accuracy or confidence level associated with determining the direction that the object is facing satisfies a threshold. If the accuracy or confidence level fails to satisfy the threshold, the autonomous driving system may utilize additional computing resources (e.g., processor resources, memory resources, communication resources, and/or the like) to obtain additional data (e.g., additional images, data from other sensors, and/or the like) and to re-calculate the direction that the object is facing based on the additional data.

Further, the amount of time that elapses while the autonomous driving system obtains the additional data and/or performs the recalculation may prevent the autonomous driving system from having sufficient time to perform the determined action prior to the vehicle reaching a location of the object (e.g., the vehicle may not have enough time to come to a complete stop prior to reaching the location of the object, the vehicle may not have enough time to maneuver around the object, and/or the like). A failure to perform the determined action prior to the vehicle reaching the location of the object may cause the vehicle to collide with the object thereby resulting in damage to the vehicle, the object, and/or the like.

Some implementations described herein may provide a viewpoint system for determining a direction that an object is facing (e.g., a direction that the object is facing relative to a vehicle, relative to a coordinate system, and/or the like). The viewpoint system may receive image data obtained by a camera on-board a vehicle. The viewpoint system may utilize a machine learning model to analyze the image data to detect an object included in the image data and to determine a direction that the object is facing. When the accuracy and/or confidence level satisfies a predetermined (or dynamic in some embodiments) threshold, the viewpoint system may not obtain additional data (e.g., additional images, data from other sensors, and/or the like) and/or may not re-perform a process for determining the direction that the object is facing. In this way, the viewpoint system may utilize fewer computing resources (e.g., processor resources, memory resources, communication resources, and/or the like) than prior systems used to determine a direction that an object is facing.

When the accuracy and/or confidence level does not satisfy the predetermined or dynamic threshold, the viewpoint system may obtain additional data and/or may re-perform the process for determining the direction that the object is facing. In this way, the viewpoint system ensures that a result of the viewpoint system (e.g., a direction the object is facing) satisfies a threshold level of accuracy and/or confidence level.

Further, because the viewpoint system may not obtain additional data and/or may not re-perform the process for determining the direction that the object is facing, the viewpoint system may allow an autonomous driving system sufficient time to determine and/or perform an action prior to a vehicle reaching a location of an object. In this way, the viewpoint system may allow a vehicle to avoid a collision with an object thereby preventing damage to the vehicle, the object, and/or the like.

FIGS. 1A-1K are diagrams of one or more example implementations 100 described herein. As shown in FIGS.

Figure 1B:
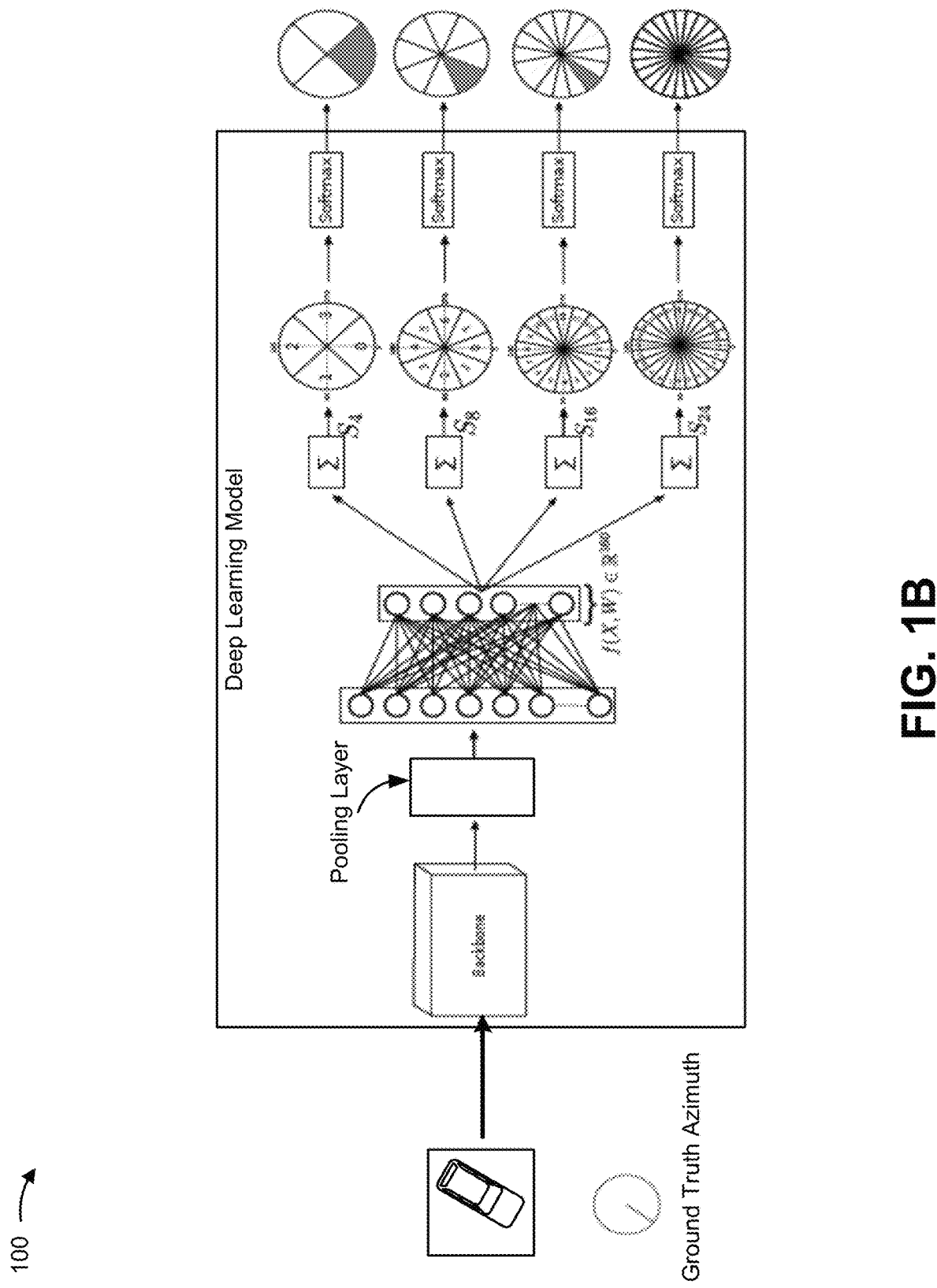
Figure 1C:
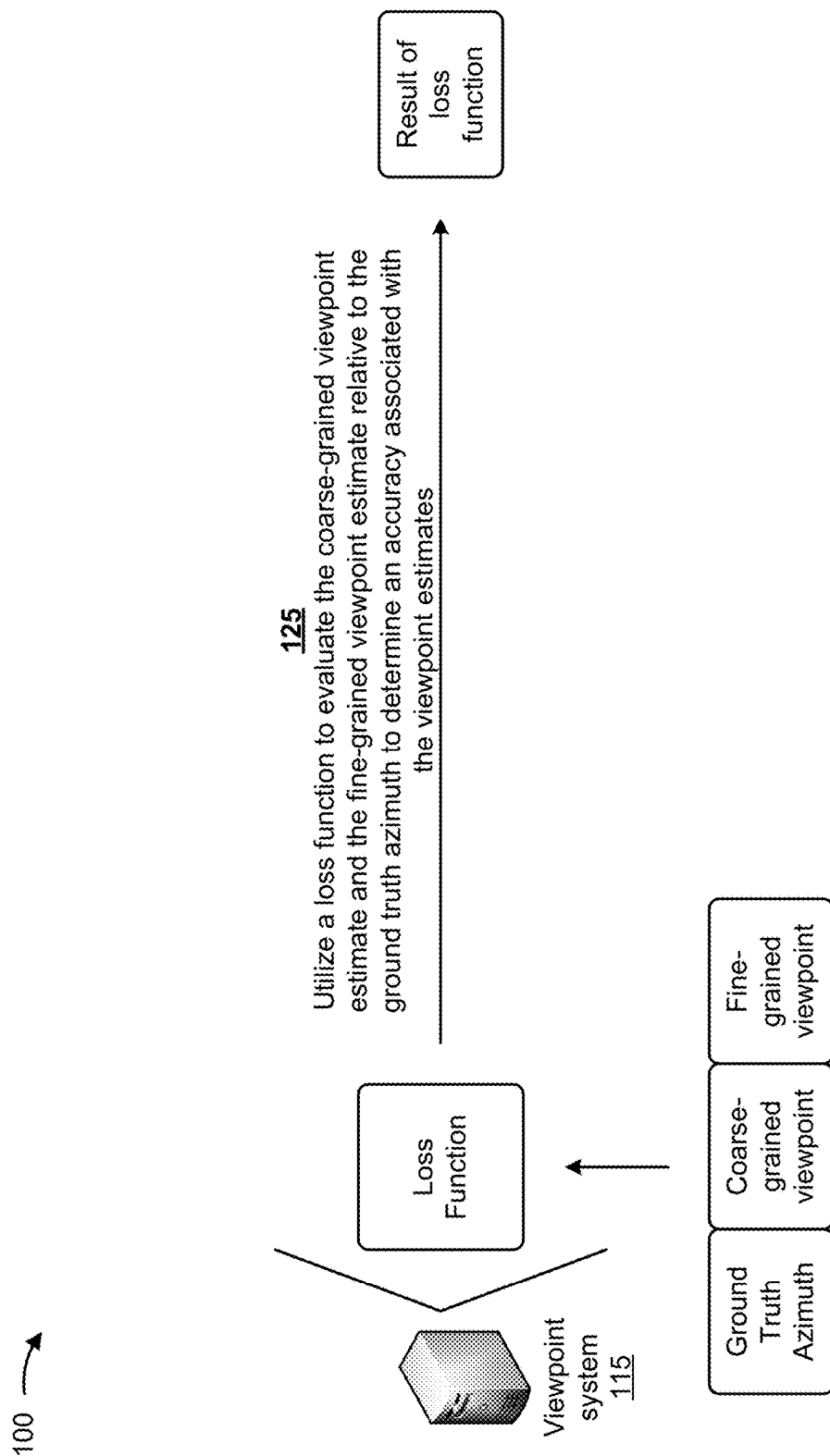
Figure 1D:
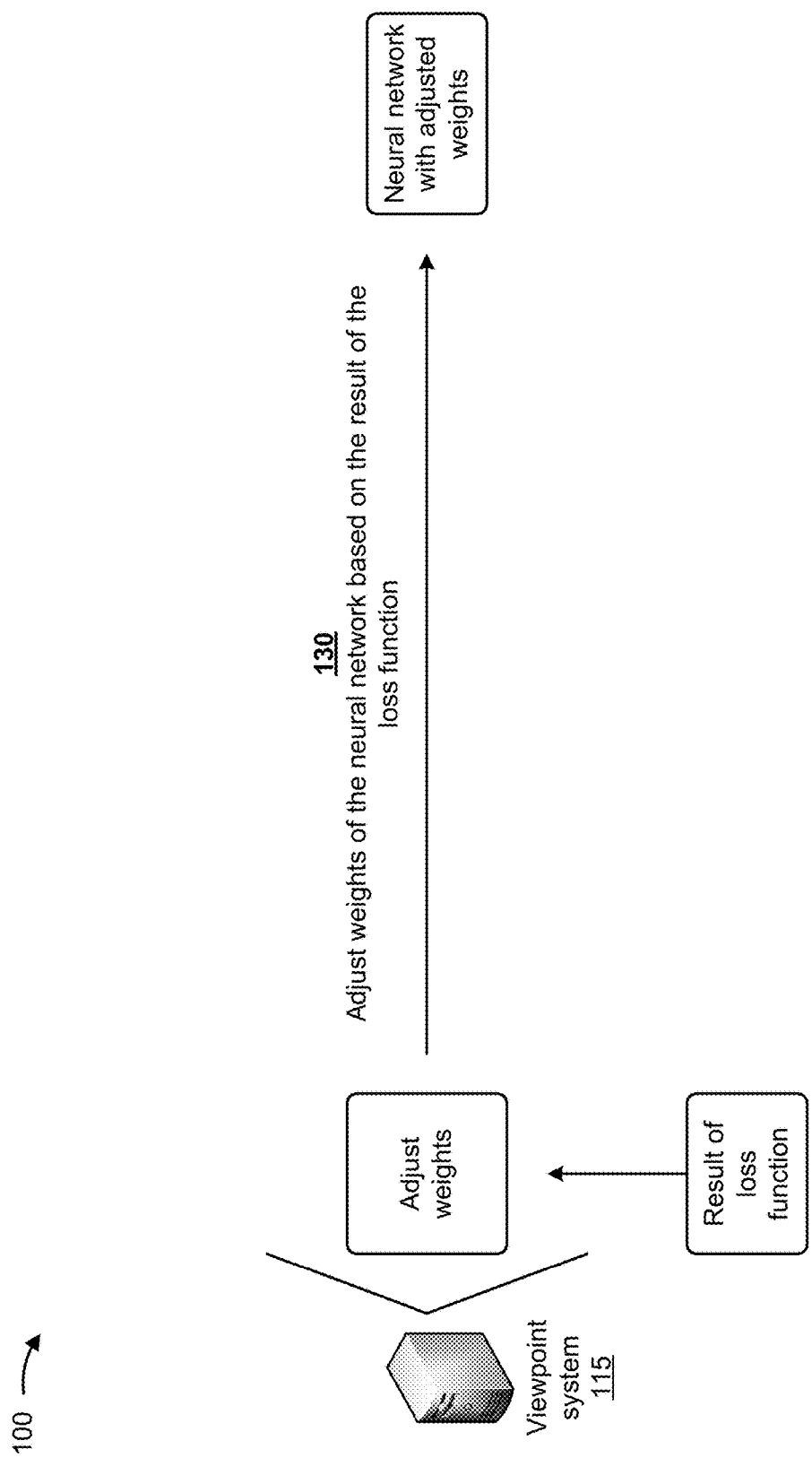
Figure 1E:
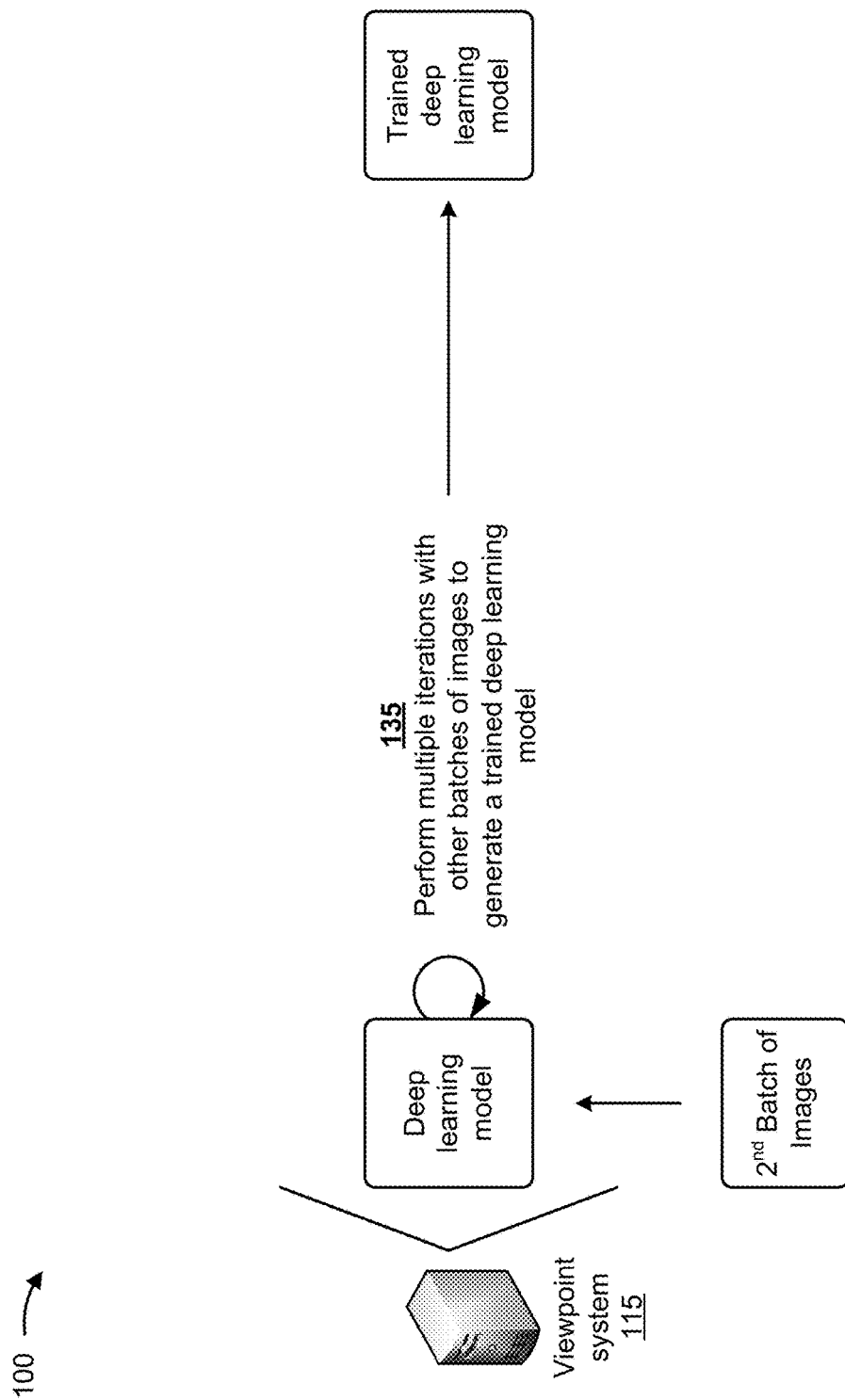
Figure 1F:
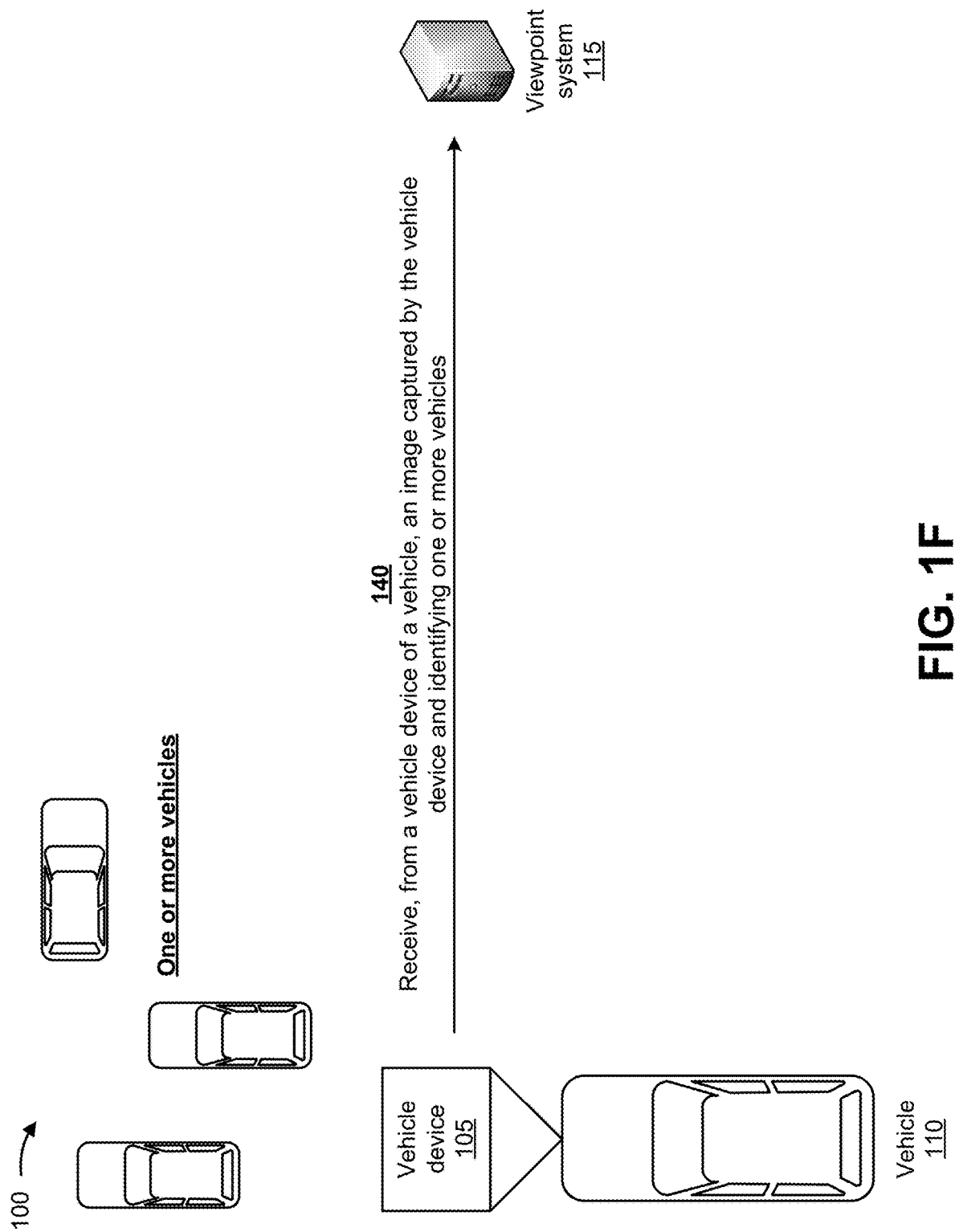

1A-1K, and collectively shown in FIG. 1F, vehicle device 105 may be associated with a vehicle 110 and a viewpoint system 115. The vehicle device 105 may include a device (e.g., a dash camera, a parking assist camera, a backup assist camera, and/or the like) that captures image data (e.g., images and/or video) associated with the vehicle 110.

The vehicle 110 may be an autonomous or semi-autonomous vehicle that includes an autonomous driving system. The autonomous driving system may perform one or more actions to control an operation of the vehicle 110 based on the image data captured by the vehicle device 105 and/or based on data received from the viewpoint system 115.

The viewpoint system 115 may include a system that obtains image data from the vehicle device 105 and analyzes the image data to detect an object included in the image and to determine a direction that the object is facing (e.g., a direction that the object is facing relative to a vehicle, relative to a coordinate system, and/or the like). The direction that the object is facing may be referred to as an object viewpoint. In some implementations, the viewpoint system 115 may utilize machine learning to analyze the image data, to detect the object included in the image, and/or to determine the object viewpoint, as described in further detail below.

In some implementations, the viewpoint system 115 is located on-board the vehicle 110. For example, the viewpoint system 115 may be part of an autonomous driving system associated with the vehicle 110. In some implementations, the viewpoint system 115 may be located remotely from the vehicle 110. For example, the viewpoint system 115 may be included on a server device associated with a service provider that provides object viewpoint determinations as a service. In some implementations, the viewpoint system 115 may be located at or near an edge of a network (e.g., a wireless communication network), such as within a multi-access edge computing (MEC) environment. In some implementations, the viewpoint system 115 may be a distributed system in that a portion of the viewpoint system 115 may be implemented within the vehicle 110 and a portion of the viewpoint system 115 may be implemented remote from the vehicle 110, such as in a location at or near an edge of a wireless communication network.

The viewpoint system 115 may generate and/or obtain a deep learning model. The deep learning model may employ a classification technique, rather than a regression technique, to determine the plurality of object viewpoints. The viewpoint system 115 may utilize a dataset to train the deep learning model to generate a trained deep learning model.

The dataset may include a plurality of images of vehicles. Each image may be associated with an annotation that includes information used to train the deep learning model, such as information identifying an object included in the image, information identifying a location of the object within the image, information identifying a ground truth azimuth angle (e.g., an azimuth angle determined manually, determined utilizing LIDAR, and/or the like corresponding to a direction that the object is facing in the image), and/or the like.

In some implementations, the viewpoint system 115 may obtain the dataset from a data structure (e.g., a database) stored in a memory. For example, the viewpoint system 115 may obtain an annotated dataset from a database storing a nuScenes dataset, a Pascal3D+ dataset, a dataset that contains images and corresponding orientations for objects and/or vehicles, and/or the like.

In some implementations, the annotated dataset may be an internal dataset (e.g., stored in a memory associated with the viewpoint system 115). The annotated dataset may include images of objects obtained by the viewpoint system 115 (e.g., images obtained from vehicle devices 105). An image included in the dataset may include an image of an object and may be associated with an annotation. The annotation may include information identifying a location of the object within the image (e.g., a bounding box), information identifying a direction the object is facing, and/or the like.

In some implementations, the annotated dataset may be a large-scale autonomous driving dataset that may be a collection of driving scenes from a point of view of a vehicle. The annotated dataset may be collected by a plurality of vehicle devices included on one or more vehicles. For example, multiple vehicle devices may be positioned at different positions on a vehicle. In some implementations, the vehicle includes vehicle devices positioned at a front-center position of the vehicle, a front-right position of the vehicle, a front-left position of the vehicle, a rear-center position of the vehicle, a rear-right position of the vehicle, and/or a rear-left position of the vehicle. The vehicle devices may include image capture devices (e.g., dashcams, cameras, and/or the like) that capture image data as the vehicle travels along a road. The positioning of the vehicle devices may cause an elevation and/or tilt of objects in the image data to be substantially the same.

The annotated dataset may include one or more annotations associated with each image included in the dataset. The one or more annotations may include information identifying a ground truth azimuth associated with an object (e.g., a vehicle) included in the image, information identifying an object class associated with an object included in the image, information identifying a location of an object in the image, and/or the like.

The annotated dataset may include annotations that include information identifying visual object classes (VOC) associated with the images included in the annotated dataset and/or three-dimension (3D) annotations. The 3D annotations may include an azimuth angle annotation that includes information identifying a ground truth azimuth associated with an object (e.g., a vehicle) in an image, a location annotation that includes information identifying a location of the object in the image, a class annotation that includes information identifying a class (e.g., vehicle, car, truck, and/or the like) associated with the object in the image, and/or the like.

In some implementations, the viewpoint system 115 may process the dataset prior to training the deep learning model. For example, the viewpoint system 115 may resize the images in the dataset to a common size, reduce a size of the images in the dataset, apply random horizontal flipping to one or more images in the dataset, normalize the images in the dataset (e.g., by subtracting a mean and dividing by a standard deviation of the images in the dataset), and/or the like.

In some implementations, the viewpoint system 115 may utilize one or more portions of the dataset to train the deep learning model. As shown in FIG. 1A, and by reference number 120, the viewpoint system 115 may process a first batch of images (e.g., 64 images, 128 images, 1,000 images, 10,000 images, and/or the like) with a deep learning model to perform a first iteration of a process for training the deep learning model to determine a coarse-grained viewpoint estimate and a fine-grained viewpoint estimate for each vehicle depicted in the first batch of images, as described in more detail below.

As shown in FIG. 1B, the deep learning model includes a backbone that receives an image of a vehicle from the first batch of images and processes the image to extract one or more features of the vehicle from the image. The backbone may be a well-established neural network associated with analyzing images, such as a CNN (e.g., MobileNetV2, Resnet50, VGG16, Inception, and/or the like), a Siamese neural network, and/or the like. In some implementations, the extracted one or more features may be output by the backbone as a feature map.

As shown in FIG. 1B, the output of the backbone (e.g., a feature map) is provided to a pooling layer of the deep learning model. The pooling layer may be a global average pooling layer, an attention layer, a flatten layer, and/or the like that aggregates space information into a single vector. The pooling layer may utilize a sliding window to reduce a dimensionality of the output of the backbone based on an average value. In this way, the pooling layer may minimize overfitting by reducing a total number of parameters (e.g., weights and/or biases).

As further shown in FIG. 1B, an output of the global average pooling layer is provided to an output layer of the deep learning model. The output layer may be a fully connected layer that processes the output of the global average pooling layer to determine one or more coarse-grained viewpoint estimates and one or more fine-grained viewpoint estimates associated with the vehicle in the image.

In some implementations, the deep learning model determines a viewpoint estimate based on the output of the pooling layer. The viewpoint estimate may be a series of probabilities. A probability, of the series of probabilities, may indicate a likelihood that a viewpoint (e.g., an azimuth angle) associated with the image of the vehicle is a particular value included in a range of possible values between 0-360 degrees. For example, a first probability, of the series of probabilities, may indicate a likelihood that the viewpoint associated with the vehicle is 0 degrees, a second probability, of the series of probabilities, may indicate a likelihood that the viewpoint associated with the vehicle is 1 degree, and/or the like.

The deep learning model may determine the coarse-grained viewpoint estimate and/or the fine-grained viewpoint estimate based on forming multiple sets of groups of the series of probabilities. A quantity of groups of the series of probabilities associated with the coarse-grained estimate may be less than a quantity of groups of the series of probabilities associated with the fine-grained estimate.

For example, the deep learning model may determine the coarse-grained viewpoint estimate based on grouping the series of probabilities into a particular number of groups, such as four groups. A first group may include a group of probabilities associated with a sub-range of the possible values from 315 to 45 degrees (e.g., a probability indicating a likelihood that the viewpoint associated with the image of the vehicle is 315 degrees, a probability indicating a likelihood that the viewpoint associated with the image of the vehicle is 316 degrees, . . . , a probability indicating a likelihood that the viewpoint associated with the image of the vehicle is 45 degrees). A second group may include a group of probabilities associated with a sub-range of the possible values from 45 to 135 degrees. A third group may include a group of probabilities associated with a sub-range of the possible values from 135 to 225 degrees. A fourth group may include a sub-range of the possible values from 225 to 315 degrees.

The deep learning model may determine a sum of the probabilities included in each group (e.g., a sum of the group of probabilities associated with a sub-range of the possible values from 315 to 45 degrees, a sum of the group of probabilities associated with a sub-range of the possible values from 45 to 135 degrees, a sum of the group of probabilities associated with a sub-range of the possible values from 135 to 225 degrees, and a sum of the group of probabilities associated with a sub-range of the possible values from 225 to 315 degrees). The deep learning model may generate a first output indicating the sum of the probabilities included in each respective group.

The viewpoint system 115 may determine the coarse-grained viewpoint estimate based on the first output. For example, the viewpoint system 115 may determine the coarse-grained estimate based on a sub-range of the possible values associated with a group for which the sum of the group of probabilities is a greatest value relative to the other sums of the groups of probabilities.

As another example, the deep learning model may determine the fine-grained estimate based on grouping the series of probabilities into a particular number of groups, such as twenty-four groups. Each group may be associated with a range of fifteen possible values. For example, a first group may include a group of probabilities associated with a sub-range of the possible values from 353 to 8 degrees, a second group may include a group of probabilities associated with a sub-range of the possible values from 8 to 23 degrees, and so on.

The deep learning model may determine a sum of the probabilities included in each group. The deep learning model may generate a second output indicating the sum of the probabilities included in each respective group. The viewpoint system 115 may determine the fine-grained viewpoint estimate based on the second output. For example, the viewpoint system 115 may determine the fine-grained estimate based on a sub-range of the possible values associated with a group for which the sum of the group of probabilities is a greatest value relative to the other sums of the groups of probabilities.

As shown in FIG. 1C, and by reference number 125, the deep learning model utilizes a loss function to evaluate each of the coarse-grained viewpoint estimate and the fine-grained viewpoint estimate relative to the ground truth azimuth to determine an accuracy associated with the viewpoint estimates.

In some implementations, the deep learning model is a multi-task model that simultaneously estimates different object viewpoints based on a summation of a network output (e.g., a summation of groups of probabilities), as described above. A loss function utilized to train the multi-task deep learning model may be defined by the following equation:

$$\mathcal{L} = \Sigma_{\alpha \in \Omega} \mathcal{L}_\alpha(y^\alpha, \hat{y}^{S\alpha}), \text{ where } \hat{y}^{S\alpha} = \text{Softmax}(S_\alpha), \quad (1)$$

where a result of a summation of the network output f(W,X) for discretization $\alpha$ may be defined as $S_\alpha \in \mathbb{R}^{\alpha}\mathbb{R}$.

In some implementations, the multi-task deep learning model includes a Siamese network. An input image (X) included in the first batch of images may have an azimuth angle label indicating an azimuth angle ($\theta$) associated with a vehicle depicted in the image. The viewpoint system 115 may flip the input image horizontally to obtain a flipped image $X_{flip}$ with an azimuth angle that is mirrored with respect to the Y axis. An operator flip: $\mathbb{R}^n \mapsto \mathbb{R}^n$ may be defined that maps $y=(y_1, y_2, \ldots, y_n)$ to flip$(y)=(y_n, y_{n-1}, \ldots, y_1)$. Each image (X) included in the first batch of images and a corresponding flipped image ($X_{flip}$) may be input to the deep learning model. A loss associated with the image and flipped image pairs (e.g., (f(W,X),$\theta$), (flip(f(W, $X_{flip}$)), θ), respectively, may be computed using equation (1), described above. The viewpoint system 115 may apply horizontal flipping and the Siamese network to enforce horizontal flipping invariance. In this way, a total accuracy, as well as an accuracy per object class (e.g., car, motorcycle, bicycle, and/or the like) of the deep learning model may be significantly increased relative to other deep learning models that do not apply horizontal flipping and a Siamese network.

A final loss may be determined based on the following equation:

$$\mathcal{L}_s = \mathcal{L} + \mathcal{L}_{flip} + \lambda D(f(W,X), \text{flip}(f(W,X_{flip}))), \quad (2)$$

where $D: \mathbb{R}^{360} \times \mathbb{R}^{360} \mapsto \mathbb{R}$ is a distance function, $\lambda \in \mathbb{R}$ is a regularization term, $\mathcal{L}$ and $\mathcal{L}_{flip}$ are obtained by applying equation (2) to the image (X) and the flipped image ($X_{flip}$), respectively. D a function of the square L2 distance and the angular distance:

$$D(X_1, X_2) = \|X_1 - X_2\|_2^2 \quad (3)$$

$$D(X_1, X_2) = \frac{1}{\pi} \arccos \frac{X_1 \cdot X_2}{\|X_1\| \|X_2\|}, \quad (4)$$

where $X_1, X_2 \in \mathbb{R}^n$.

To complete the first iteration of the process for training the deep learning model, the deep learning model may process each image included in the first batch of images in a manner similar to that described above with respect to FIGS. 1A-1B. In some implementations, the deep learning model modifies one or more parameters of the deep learning model based on a result of the loss function determined for each image included in the first batch of images. The result of the loss function determined for an image may represent an accuracy of the coarse-grained viewpoint estimate and/or the fine-grained viewpoint estimate determined for the image relative to the ground truth azimuth associated with the image. As shown in FIG. 1D, and by reference number 130, the deep learning model adjusts one or more weights of the neural network based on the result of the loss function.

As shown in FIG. 1E, and by reference number 135, the deep learning model performs multiple iterations of the process for training the deep learning model with other batches of images to generate a trained deep learning model. In some implementations, the deep learning model may continue to perform iterations of the process with different batches of images for a certain number of iterations, until an accuracy associated with the viewpoint estimates stops increasing with respect to accuracies determined for previous batches of images, until an accuracy associated with the viewpoint estimates decreases or increases by an amount that does not satisfy a threshold with respect to accuracies determined for previous batches of images, and/or the like.

In some implementations, the viewpoint system 115 may utilize the trained deep learning model to determine viewpoint estimates for vehicles depicted in images captured by vehicle devices. As indicated above, in some implementations, the viewpoint system 115 may be implemented within a vehicle. In this case, the vehicle may utilize the trained deep learning model to determine viewpoint estimates for vehicles depicted in images captured by a vehicle device of the vehicle.

As shown in FIG. 1F, and by reference number 140, the viewpoint system 115 receives, from a vehicle device 105 of a vehicle 110, an image captured by the vehicle device 105 and depicting one or more vehicles. For example, the vehicle device 105 may include a dashcam that captures an image of an environment in which the vehicle 110 is located. In some implementations, the image may be a single image captured by the vehicle device 105. For example, the vehicle device 105 may be a camera device such as a dashcam and the image may be a single monocular red-green-blue (RGB) image, a grayscale image, a thermal image, a large band spectrum image, a narrow band spectrum image, and/or the like. Alternatively, and/or additionally, the image may be included in a plurality of images provided to the viewpoint system 115. For example, the vehicle device 105 may capture video of the environment in which the vehicle 110 is located. The video may include a plurality of images (e.g., a plurality of frames of image data) that includes the image and the vehicle device 105 may provide the plurality of images to the viewpoint system 115.

In some implementations, the vehicle device 105 captures the image and/or provides the image to the viewpoint system 115 based on an occurrence of an event. For example, the vehicle device 105 may provide the image to the viewpoint system 115 based on receiving an input from a user, receiving an instruction to capture and/or provide the image to the viewpoint system 115 from another device (e.g., a controller included in an autonomous driving system, the viewpoint system 115, and/or the like), determining that the vehicle 110 is operating in an autonomous driving mode, and/or the like.

In some implementations, the vehicle device 105 provides the image to the viewpoint system 115 in real-time. For example, the vehicle device 105 may be included in an autonomous driving system of the vehicle 110. The vehicle device 105 may capture and/or provide images to the viewpoint system 115 as the vehicle 110 travels along a roadway to cause the viewpoint system 115 to analyze the images and to provide information identifying objects included in the images and/or information indicating an object viewpoint associated with the objects to the autonomous driving system.

In some implementations, the vehicle device 105 transmits the image directly to the viewpoint system 115. For example, the vehicle device 105 may include a communication device for communicating data over a cellular network (e.g., a 3G network, a 4G network, a 5G network, and/or the like). The vehicle device 105 may utilize the communication device to transmit the image to the viewpoint system 115 via the cellular network.

In some implementations, the vehicle device 105 transmits the image to the viewpoint system 115 via another device associated with the vehicle 110. For example, the vehicle device 105 may transmit, via a wired and/or wireless connection, the image to a communication device included in an autonomous driving system, to a mobile device of a user in the vehicle (e.g., a driver, a passenger, and/or the like), and/or the like. The communication device, the mobile device, and/or the like may receive the image from the vehicle device 105 and may transmit the image to the viewpoint system 115.

Figure 1G:
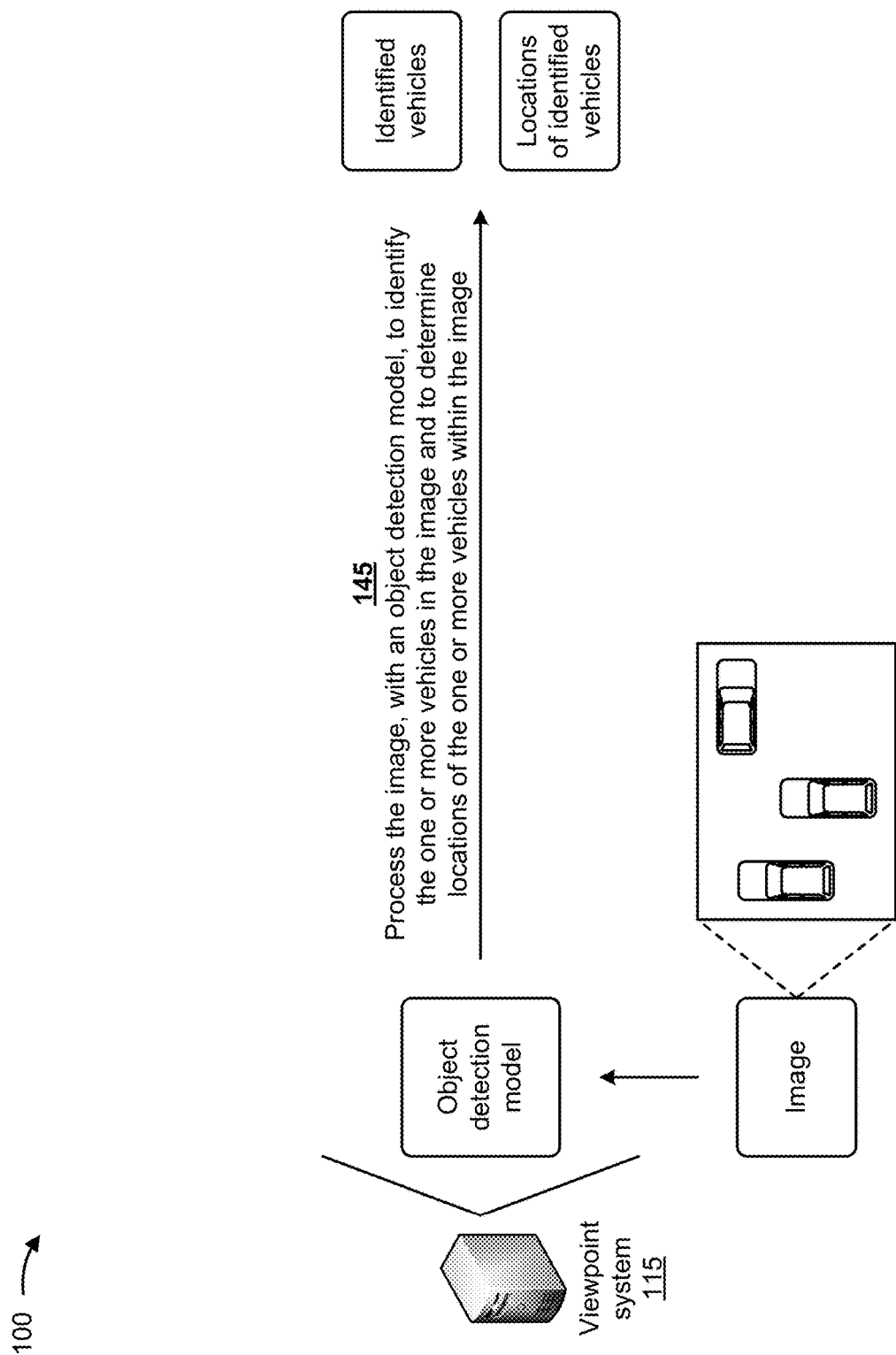

In some implementations, the viewpoint system 115 may analyze the image to identify one or more objects depicted in the image based on receiving the image. For example, as shown in FIG. 1G, and by reference number 145, the viewpoint system 115 may process the image, with an object detection model, to identify the one or more vehicles in the image and to determine locations of the one or more vehicles within the image based on receiving the image from the vehicle device 105. While the description herein will focus on objects that are vehicles, the description also applies to other types of objects, such as people, bicycles, traffic signs, and/or the like.

The object detection model may include a you-only-look-once (YOLO) object detector, a single shot detector (SSD), a Faster-region convolutional neural network (RCNN) object detector, and/or the like. The object detection model may receive the image as an input and may output information indicating that the image depicts the one or more vehicles and information identifying a location of the one or more vehicles within the image.

The object detection model may be trained in a manner similar to that described below with respect to FIG. 2. For example, the viewpoint system 115 may train the object detection model based on one or more parameters, such as a number of classes of objects, a batch size (e.g., a number of images used in one iteration to update the parameters of the object detection model (e.g., weights, parameters, and/or the like)), a parameter associated with penalizing particular changes to the parameters of the object detection model between iterations (e.g., a momentum parameter that penalizes certain changes to a weight parameter between iterations and/or the like), and/or the like. The viewpoint system 115 may train the object detection model using image data containing images of vehicles according to the one or more parameters.

The trained object detection model may receive the image from the viewpoint system 115 as an input and may process the image to detect the images of the one or more vehicles and to determine the information identifying the location of the one or more vehicles within the image. The trained object detection model may process the image in a manner similar to that described below with respect to FIG. 3.

In some implementations, the information identifying the location of a vehicle, of the one or more vehicles depicted in the image, includes information identifying a bounding box for the vehicle. The information identifying the bounding box may include information identifying a perimeter of the bounding box. The perimeter of the bounding box may surround the entire vehicle depicted in the image. For example, the bounding box may be a two-dimensional bounding box (e.g., a rectangle) and the information identifying the perimeter of the bounding box may include a set of coordinates corresponding to an upper left corner of the bounding box within the image, a set of coordinates corresponding to a lower right corner of the bounding box within the image, information identifying an angular displacement of the bounding box relative to a line extending along an edge and/or a center of the image, and/or the like.

In some implementations, the viewpoint system 115 may receive the information indicating that the image depicts the one or more vehicles and/or the information identifying the location of the one or more vehicles within the image from the vehicle 110. For example, the object detection model may be included in an autonomous driving system associated with the vehicle 110. The vehicle device 105 may provide the image to the autonomous driving system based on capturing the image. The autonomous driving system may process the image, with the object detection model, to identify the one or more vehicles in the image and to determine the locations of the one or more vehicles within the image based on receiving the image from the vehicle device 105. The autonomous driving system may provide the image, the information indicating that the image depicts the one or more vehicles, and/or the information identifying the location of the one or more vehicles within the image to the viewpoint system 115.

Figure 1H:
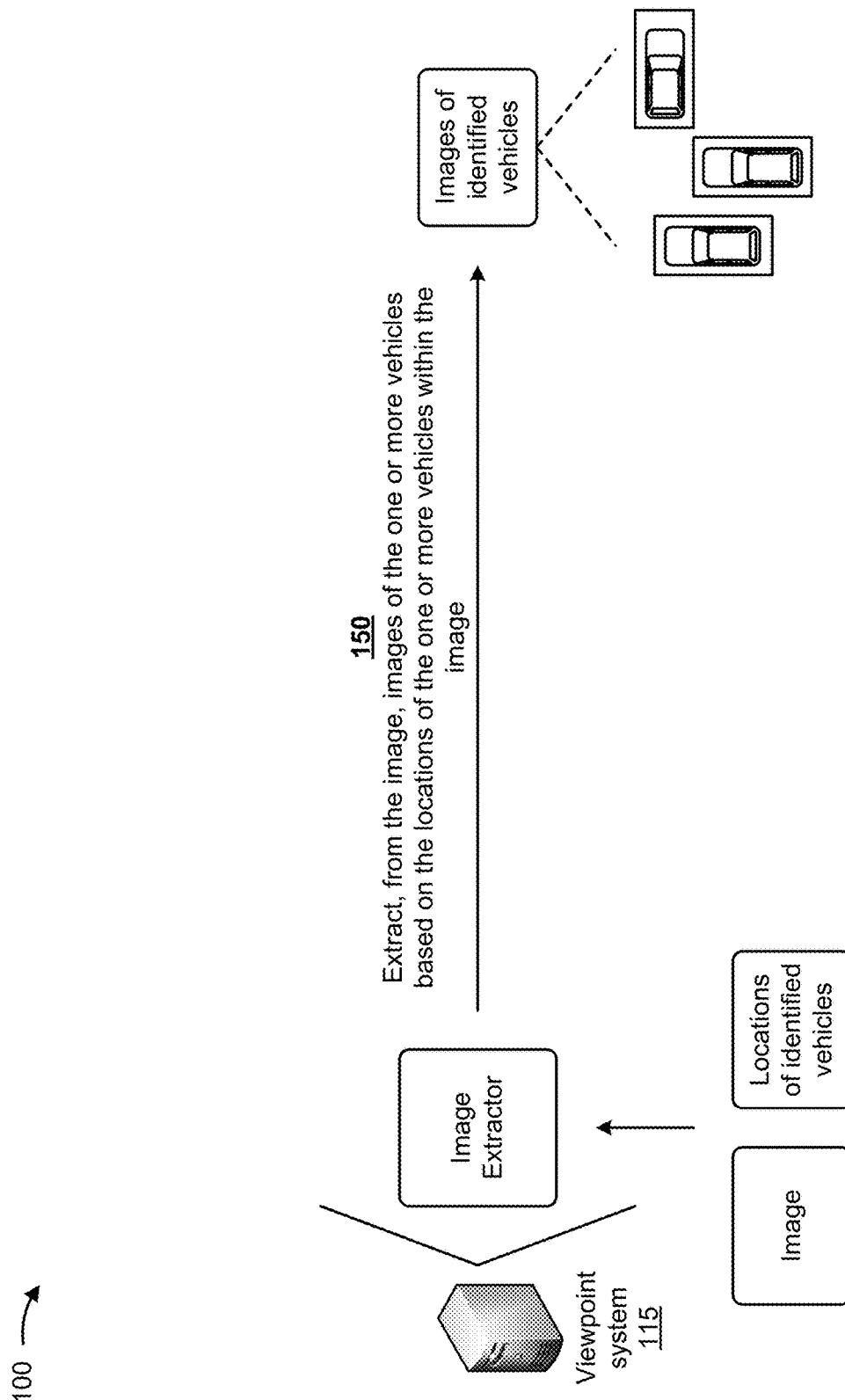

As shown in FIG. 1H, and by reference number 150, the viewpoint system 115 extracts, from the image, images of the one or more vehicles based on the output of the object detection model. The viewpoint system 115 may determine a location of a vehicle depicted in the image based on the information identifying the bounding box associated with the vehicle. The viewpoint system 115 may extract the image of the vehicle from the image by extracting a portion of the image inside the perimeter of the bounding box associated with the image of the vehicle. In some implementations, the viewpoint system 115 extracts the image of the vehicle by cropping the image to remove a portion of the image that is located outside the perimeter of the bounding box associated with the image of the vehicle.

Figure 1I:
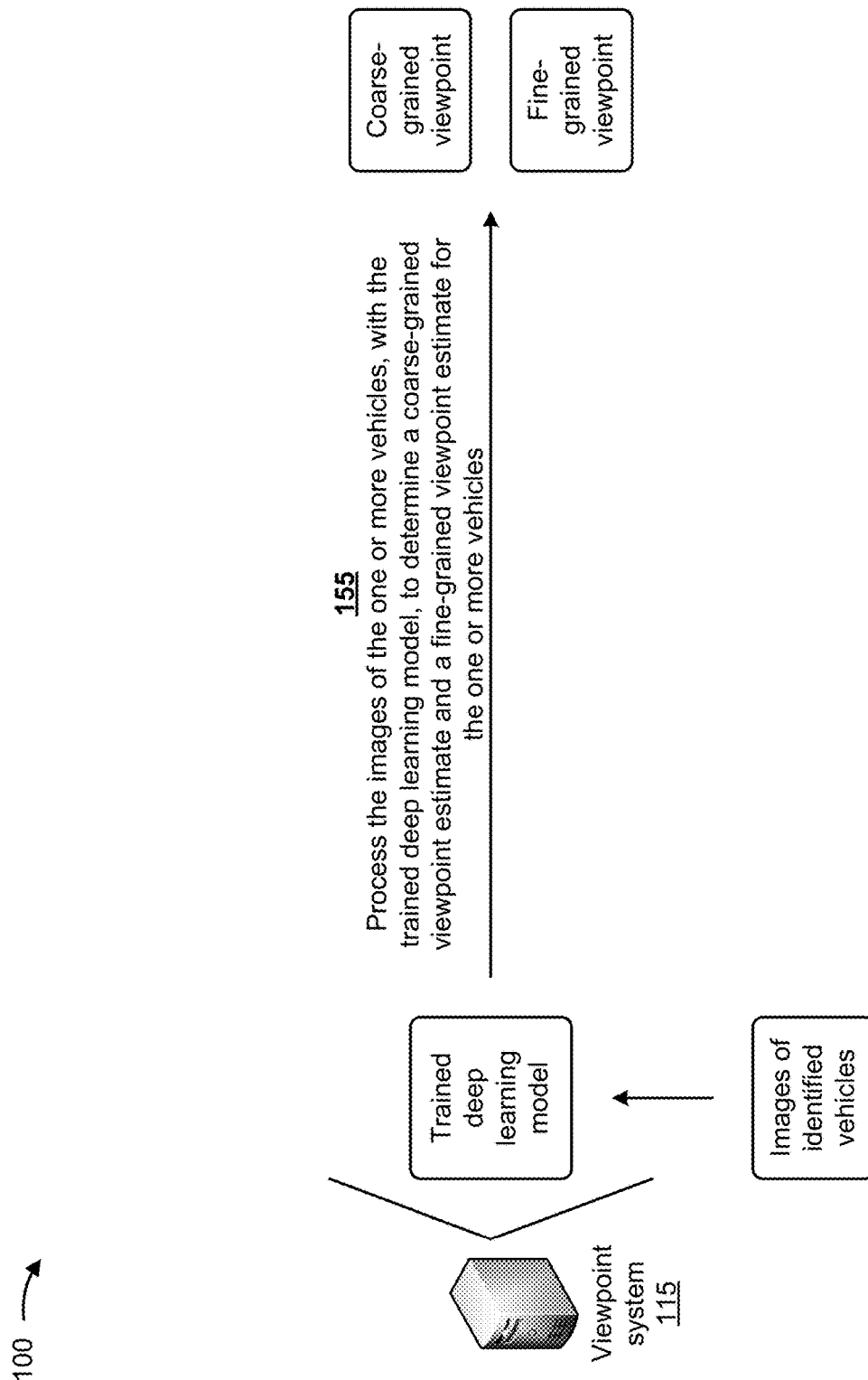

As shown in FIG. 1I, and by reference number 155, the viewpoint system 115 processes the images of the one or more vehicles with the trained deep learning model to determine one or more coarse-grained viewpoint estimates and one or more fine-grained viewpoint estimates for the one or more vehicles. In some implementations, the viewpoint system 115 determines the one or more coarse-grained viewpoint estimates and the one or more fine-grained viewpoint estimates in a manner similar to that described above with respect to FIGS. 1A-1B.

As shown in FIG. 1J, and by reference number 160, the viewpoint system 115 determines an object viewpoint associated with a vehicle, of the one or more vehicles, based on the one or more coarse-grained viewpoint estimates and/or the one or more fine-grained viewpoint. For example, the one or more coarse-grained viewpoint estimates and the one or more fine-grained estimates may include multiple viewpoint estimates ranging from a coarsest-grained viewpoint estimate (e.g., a viewpoint estimate determined based on grouping the series of probabilities into four groups) to a finest-grained viewpoint estimate (e.g., a viewpoint estimate determined based on grouping the series of probabilities into 24 groups).

Each viewpoint estimate may be associated with accuracy information (e.g., information indicating an accuracy, a confidence level, and/or the like). The viewpoint system 115 may determine the viewpoint associated with the object based on the multiple viewpoint estimates and based on the accuracy information. For example, the multiple viewpoint estimates may include a coarsest-grained viewpoint estimate associated with first accuracy information, a coarse-grained viewpoint estimate associated with second accuracy information, a fine-grained viewpoint estimate associated with third accuracy information, and a finest-grained viewpoint estimate associated with fourth accuracy information.

The viewpoint system 115 may identify each viewpoint estimate, of the multiple viewpoint estimates, associated with accuracy information that satisfies a threshold (e.g., 90% accurate, 95% accurate, 98% accurate, and/or the like). For example, the viewpoint system 115 may determine that the first accuracy information, the second accuracy information, and the third accuracy information satisfy the threshold and/or that the fourth accuracy information does not satisfy the threshold.

In some implementations, the threshold may be determined based on an average accuracy associated with training the deep learning model. For example, the threshold may be determined based on an accuracy (e.g., an average accuracy, a highest accuracy, a lowest accuracy, and/or the like) achieved by the deep learning model when analyzing a test set of images.

Alternatively, and/or additionally, the threshold may be determined based on a size of an object in the image being analyzed. The viewpoint system 115 may utilize a larger threshold (e.g., 95%) when the object is larger than a threshold size in the image, when the object comprises at least a threshold percentage of the entire image, and/or the like. The viewpoint system 115 may utilize a smaller threshold (e.g., 90%) when the object is smaller than the threshold size in the image, when the object comprises less than the threshold percentage of the entire image, and/or the like.

The viewpoint system 115 may determine that the fine-grained viewpoint estimate is the finest-grained viewpoint estimate of the viewpoint estimates associated with accuracy information satisfying the threshold. Stated differently, the viewpoint system 115 may determine that a granularity of the fine-grained viewpoint estimate is the finest granularity relative to every other viewpoint estimate (whether course-grained or fine-grained) associated with accuracy information that satisfies the threshold. The viewpoint system 115 may determine the object viewpoint based on the fine-grained viewpoint estimate being the finest-grained viewpoint estimate of the viewpoint estimates associated with accuracy information satisfying the threshold.

In some implementations, the object viewpoint is a range of azimuth angles. For example, the viewpoint system 115 may determine a range of azimuth angles associated with the selected viewpoint estimate (e.g., the fine-grained viewpoint estimate from the example described above). The viewpoint system 115 may determine the object viewpoint based on the range of azimuth angles.

In some implementations, the viewpoint system 115 determines a direction of travel associated with the vehicle based on the object viewpoint. For example, the viewpoint system 115 may determine a range of azimuth angles associated with the selected viewpoint estimate. The viewpoint system 115 may determine that the range of azimuth angles corresponds to a particular direction (e.g., east, west, north, south, toward the vehicle 110, away from the vehicle 110, and/or the like). The viewpoint system 115 may determine the vehicle is facing the particular direction based on the range of azimuth angles corresponding to the particular direction.

The viewpoint system 115 may obtain an additional image of the vehicle (e.g., from vehicle device 105). The viewpoint system 115 may utilize the object detection model to process the additional image and to determine a bounding box indicating a location of the vehicle within the additional image. The viewpoint system 115 may compare the bounding box determined based on the additional image with a bounding box determined based on the image to determine a direction of movement associated with the bounding boxes.

For example, the viewpoint system 115 may determine that the bounding box determined based on the image has a center point that is a first distance from a bottom edge of the image and is a second distance from a left edge of the image. The viewpoint system 115 may determine that the bounding box determined based on the additional image has a center point that is a third distance from the bottom edge of the image and is the second distance from the left edge of the image.

The viewpoint system 115 may determine that the vehicle is facing away from the vehicle 110 based on the selected viewpoint estimate (e.g., the range of azimuths associated with the selected viewpoint estimate is from 350 to 10 degrees). The viewpoint system 115 may determine that the movement of direction associated with the bounding boxes corresponds to the direction that the vehicle is facing and, therefore, that the direction of travel of the vehicle is in the particular direction, when the third distance is greater than the first distance. The viewpoint system 115 may determine that the movement of direction associated with the bounding boxes does not correspond to the direction that the vehicle is facing and, therefore, that the vehicle is moving in a direction opposite to the particular direction (e.g., the vehicle is driving in reverse gear) when the third distance is less than the first distance.

In some implementations, the viewpoint system 115 may identify one or more lane directions of a roadway being traveled by the one or more vehicles and/or the vehicle 110 based on the direction of travel. For example, the viewpoint system 115 may determine that a vehicle, of the one or more vehicles, is traveling in a lane of a roadway adjacent to a lane of the roadway in which the vehicle 110 is traveling based on the object viewpoint. The viewpoint system 115 may determine a lane direction of the adjacent lane based on the direction of travel of the vehicle.

Figure 1K:
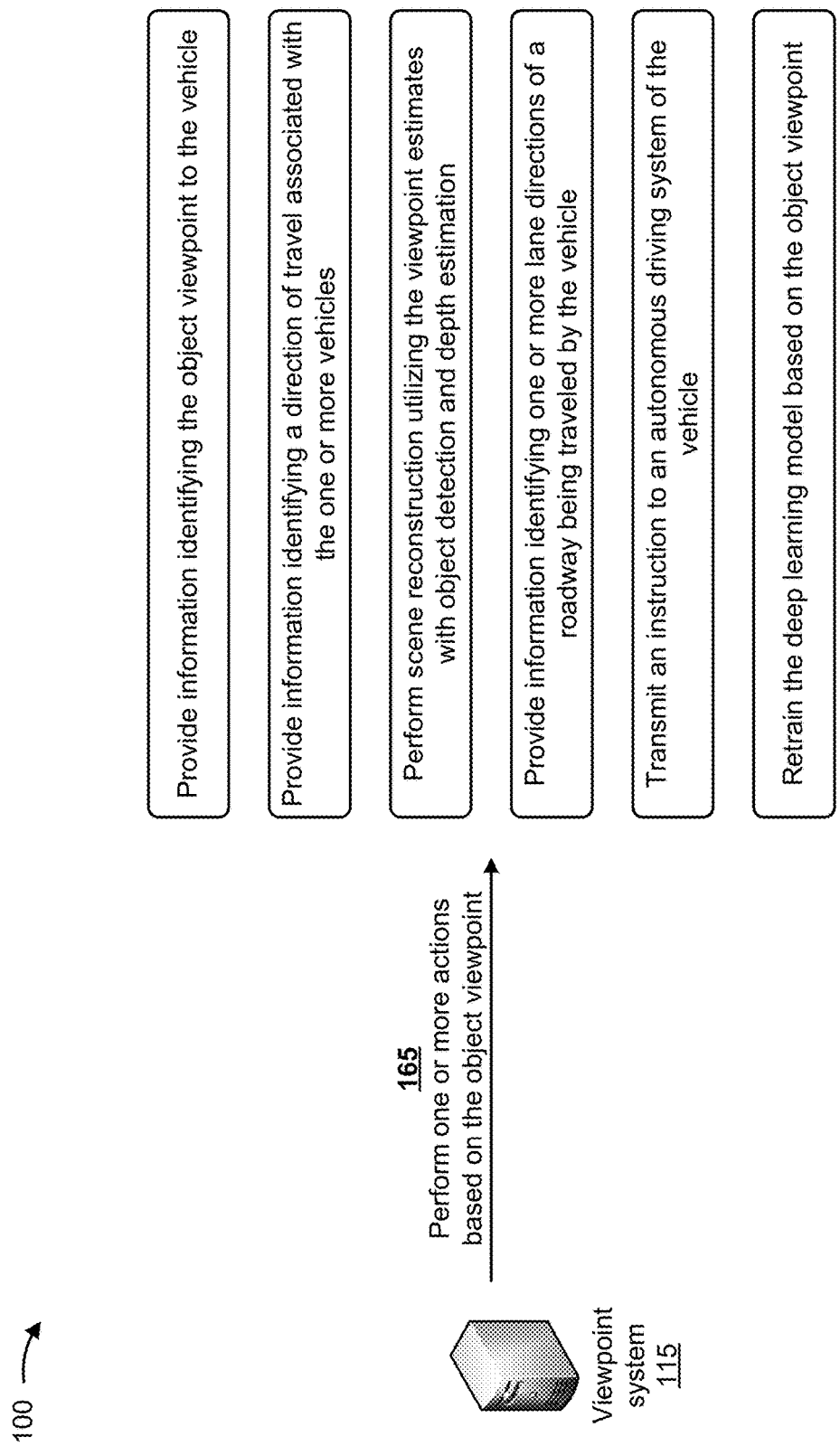

As shown in FIG. 1K, and by reference number 165, the viewpoint system 115 may perform one or more actions based on determining the object viewpoint. In some implementations, the one or more actions may include providing information identifying a direction of travel associated with the one or more vehicles. For example, the viewpoint system 115 may determine a direction of travel associated with a vehicle, of the one or more vehicles, in a manner similar to that described above with respect to FIG. 1J. The viewpoint system 115 may provide information identifying the direction of travel to an autonomous driving system of the vehicle 110. The autonomous driving system may control an operation of the vehicle 110 based on the information identifying the direction of travel. In this way, the viewpoint system 115 may assist the autonomous driving system in controlling the operation of the vehicle 110 in an efficient manner.

Further, in some implementations where the viewpoint system 115 is located remotely from the vehicle 110 (e.g., the viewpoint system 115 is implemented in one or more MEC nodes, a cloud computing environment, and/or the like), a cost associated with the computing resources utilized to determine the object viewpoint, the direction of travel, and/or the like may be shared by multiple autonomous driving systems. By sharing the cost associated with the computing resources, a cost of operating an autonomous vehicle 110 may be reduced.

In some implementations, the one or more actions may include performing scene reconstruction utilizing the object viewpoint with object detection and depth estimation. For example, the viewpoint system 115 may identify the one or more vehicles and one or more additional objects depicted in the image based on an output of the object detection model. The viewpoint system 115 may utilize a depth estimation model that receives the image as an input and generates a depth image as an output. The depth image may include information indicating a distance of the one or more vehicles and the one or more additional objects from the vehicle 110. The viewpoint system 115 may generate a digital representation of the one or more vehicles and/or the one or more additional objects based on the viewpoint estimates, the distance of the one or more vehicles from the vehicle 110, and/or the distance of the one or more additional objects from the vehicle 110. The digital representation and/or digital representations generated based on one or more other images, may be utilized to determine a series of events resulting in an occurrence of an event (e.g., an accident, a traffic violation, and/or the like) and/or to provide an automated description of scenes depicted in video and/or still-image data. In this way, the viewpoint system 115 may analyze large amounts of video and/or still-image data relative to other systems for performing scene reconstruction and/or automated description of scenes, which improves an accuracy of the scene reconstruction and/or automated description of scenes.

In some implementations, the one or more actions may include providing information identifying one or more lane directions of a roadway being traveled by the vehicle 110. For example, the viewpoint system 115 may provide the information identifying the lane directions to an autonomous driving system of the vehicle 110, to a network device associated with providing driving directions to a user device, the autonomous driving system, and/or the like, and/or the like.

As an example, the vehicle device 105 may capture an image of a road having two lanes. The image includes a first vehicle in a first lane and a second vehicle in a second, adjacent lane. The viewpoint system 115 may obtain the image from the vehicle device 105 and may utilize the deep learning model to determine a direction each vehicle is facing relative to the vehicle device 105. The viewpoint system 115 may determine that the first vehicle is facing towards the vehicle device 105 (e.g., has an orientation of zero degrees) and that the second vehicle is facing away from the vehicle device 105 (e.g., has an orientation of 180 degrees). The viewpoint system 115 may determine a lane direction of the first lane is opposite to a lane direction of the second lane based on the first vehicle facing towards the vehicle device 105 and the second vehicle facing away from the vehicle device 105. The viewpoint system 115 may provide information identifying the lane directions to an autonomous driving system of the vehicle 110. In this way, information regarding changes to lane directions caused by accidents, construction, and/or the like may be propagated through the viewpoint system 115 more quickly and efficiently relative to prior systems for propagating information identifying changes to lane directions.

In some implementations, the one or more actions may include transmitting an instruction to an autonomous driving system of a vehicle. For example, the viewpoint system 115 may determine that the vehicle 110 is to perform a particular action (e.g., slow down, stop, turn, and/or the like) based on the direction of travel, the lane direction of the roadway, and/or the like. The viewpoint system 115 may transmit an instruction to the autonomous driving system of the vehicle 110 to cause the autonomous driving system to cause the vehicle 110 to perform the particular action. In this way, one or more functions performed by the autonomous driving system may be performed by the viewpoint system 115. By having the viewpoint system 115 perform one or more functions of the autonomous driving system, the autonomous driving system may utilize fewer computing resources to control the operation of the vehicle 110.

In some implementations, the one or more actions may include retraining the deep learning model based on the object viewpoint. For example, the image, information identifying the object viewpoint, and/or information identifying the ground truth azimuth of the one or more vehicles may be included in a dataset used to train the deep learning model to generate a modified dataset. The deep learning model may be re-trained based on the modified dataset in a manner similar to that described with respect to FIGS. 1A-1E. In this way, an accuracy of the deep learning model with respect to determining the coarse-grained viewpoint estimate and/or the fine-grained viewpoint estimate may be increased.

According to some implementations described herein, the viewpoint system 115 may determine an object viewpoint estimate based on an image of an object without obtaining additional data, without using expensive LIDAR, and with an accuracy that satisfies a threshold level of accuracy. In this way, the viewpoint system 115 may conserve computing resources (e.g., processing resource, memory resources, communication resources, and/or the like) relative to prior systems used to determine object viewpoint estimation.

As indicated above, FIGS. 1A-1K are provided as an example. Other examples may differ from what is described with regard to FIGS. 1A-1K. The number and arrangement of devices shown in FIGS. 1A-1K are provided as an example. In practice, there may be additional devices, fewer devices, different devices, or differently arranged than those shown in FIGS. 1A-1K. Furthermore, two or more devices shown in FIGS. 1A-1K may be implemented within a single device, or a single device shown in FIGS. 1A-1K may be implemented as multiple, distributed devices. Additionally, or alternatively, a set of devices (e.g., one or more devices) shown in FIGS. 1A-1K may perform one or more functions described as being performed by another set of devices shown in FIGS. 1A-1K.

Figure 2:
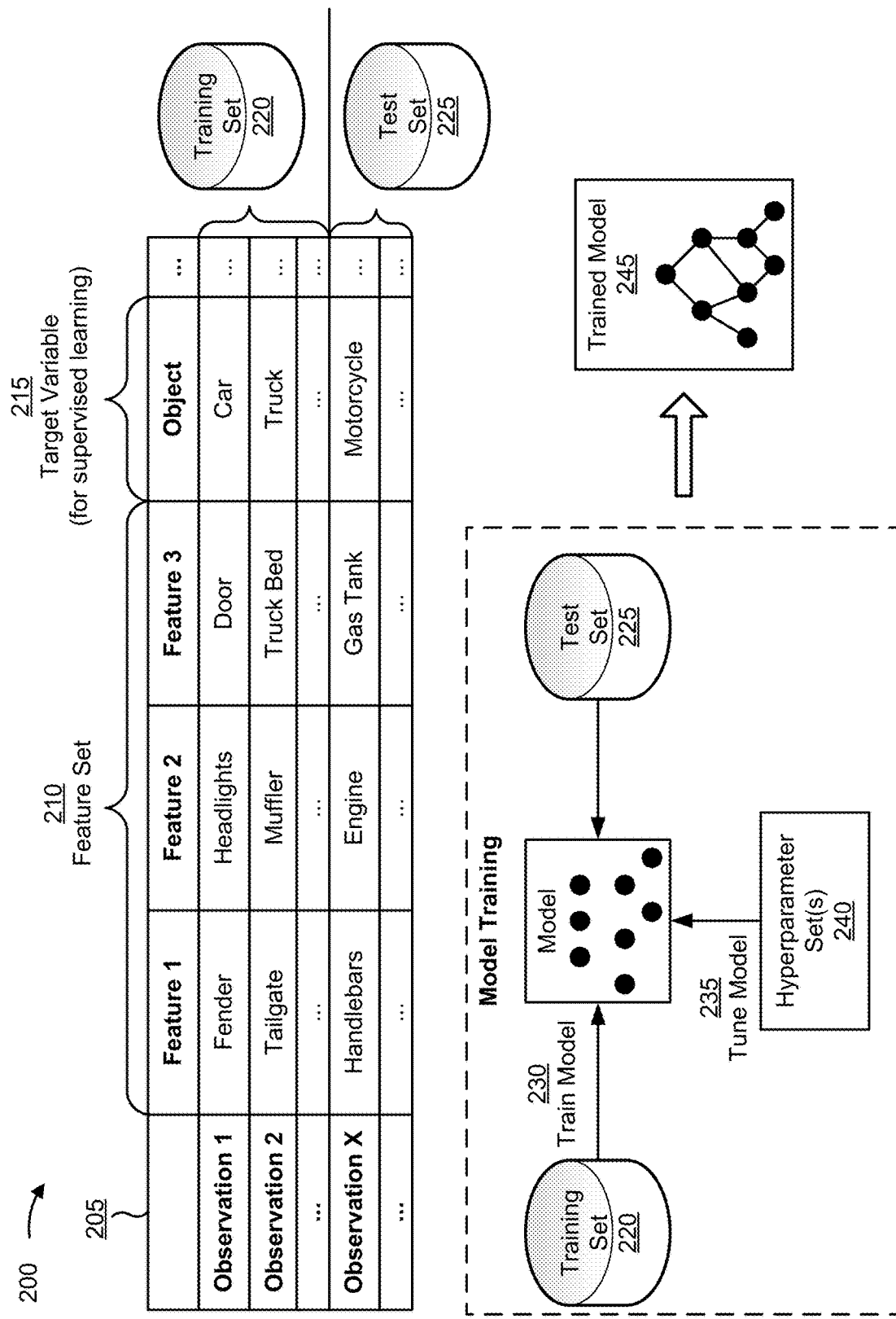
FIG. 2 is a diagram an example of training a machine learning model.

FIG. 2 is a diagram illustrating an example 200 of training a machine learning model. The machine learning model training described herein may be performed using a machine learning system. The machine learning system may include a computing device, a server, a cloud computing environment, and/or the like, such as viewpoint system 115.

As shown by reference number 205, a machine learning model may be trained using a set of observations. The set of observations may be obtained and/or input from historical data, such as data gathered during one or more processes described herein. In some implementations, the machine learning system may receive the set of observations (e.g., as input) from the viewpoint system 115. In some implementations, the machine learning system may obtain the set of observations from a data structure (e.g., a database) stored in a memory. For example, the machine learning system may obtain the set of observations from a database storing an annotated dataset such as, for example, a nuScenes dataset, a Pascal3D+ dataset, a dataset including images annotated with object bounding boxes and orientation information, and/or the like.

As shown by reference number 210, a feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system may determine variable values for a specific observation based on input received from viewpoint system 115 and/or vehicle device 105. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variables types) for a feature set based on input received from viewpoint system 115 and/or vehicle device 105, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature, a second feature, a third feature, and so on. As shown, for a first observation, the first feature may have a value of fender, the second feature may have a value of headlights, the third feature may have a value of door, and so on. These features and feature values are provided as examples, and may differ in other examples. In some implementations, the machine learning system may perform one or more actions to pre-process and/or perform dimensionality reduction to reduce the feature set and/or combine features of the feature set to a minimum feature set.

A machine learning model may be trained on the minimum feature set, thereby conserving resources of the machine learning system (e.g., processing resources, memory resources, and/or the like) used to train the machine learning model.

As shown by reference number 215, the set of observations may be associated with a target variable type. The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations, of the set of observations, and a test set 225 that includes a second subset of observations of the set of observations. The training set 220 may be used to train (e.g., fit, tune, and/or the like) the machine learning model, while the test set 225 may be used to evaluate a machine learning model that is trained using the training set 220. For example, for supervised learning, the training set 220 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 50%, 75%, 80%, or 85%, among other examples) and including a second portion or a second percentage of the set of observations in the test set 225 (e.g., 50%, 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like.

A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used, based on randomly generating hyperparameter values, and/or the like). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups, based on randomly selecting a number of groups, and/or the like) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, closest to a desired threshold, and/or the like) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 245.

As indicated above, FIG. 2 is provided as an example. Other examples may differ from what is described in connection with FIG. 2. For example, the machine learning model may be trained using a different process than what is described in connection with FIG. 2. Additionally, or alternatively, the machine learning model may employ a different machine learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 3:
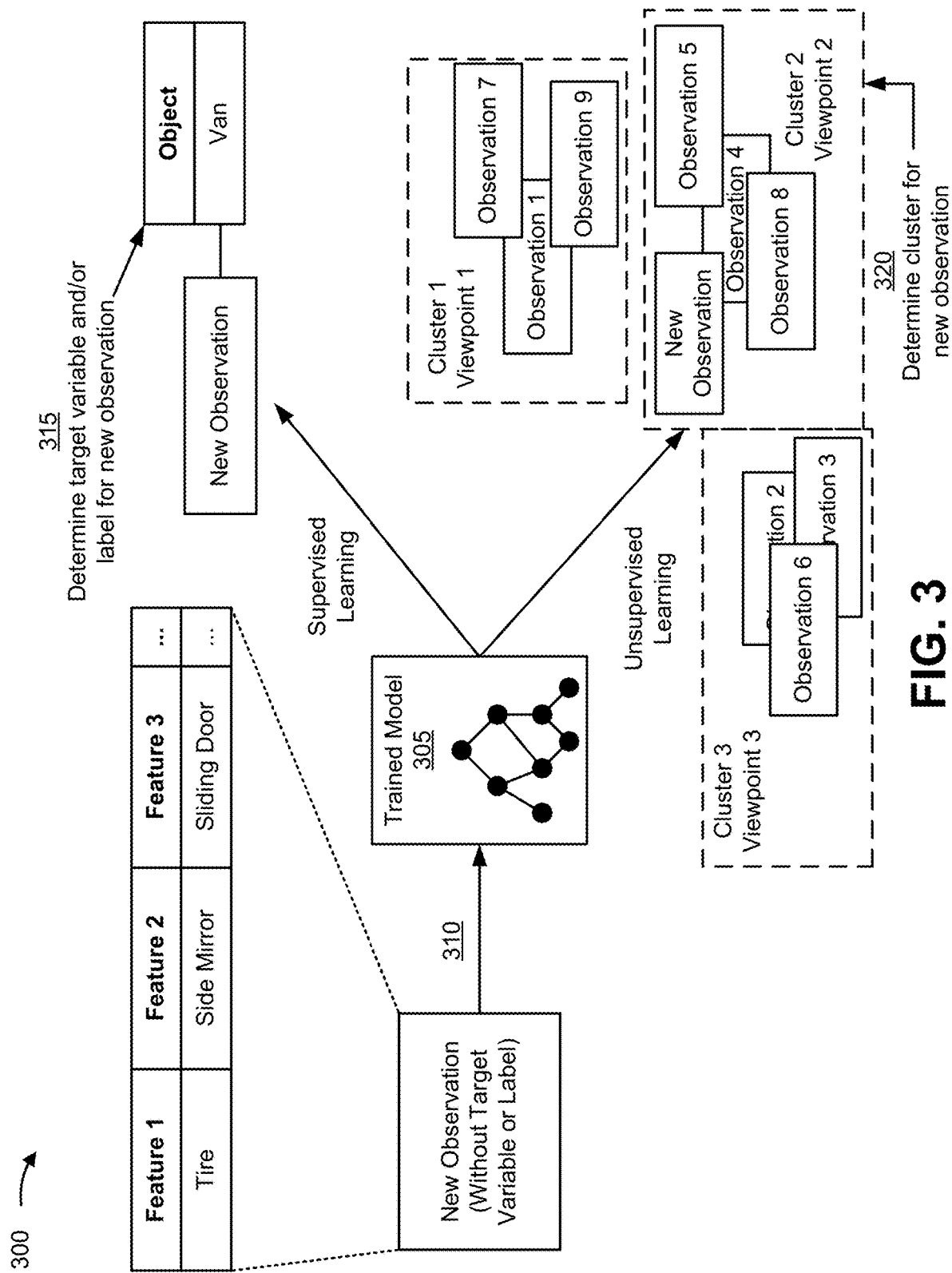
FIG. 3 is a diagram illustrating an example of applying a trained machine learning model to a new observation.

FIG. 3 is a diagram illustrating an example 300 of applying a trained machine learning model to a new observation. The new observation may be input to a machine learning system that stores a trained machine learning model 305. In some implementations, the trained machine learning model 305 may be the trained machine learning model 245 described above in connection with FIG. 2. The machine learning system may include a computing device, a server, a cloud computing environment, and/or the like, such as viewpoint system 115.

As shown by reference number 310, the machine learning system may receive a new observation (or a set of new observations), and may input the new observation to the machine learning model 305. As shown, the new observation may include a first feature, a second feature, a third feature, and so on, as an example. The machine learning system may apply the trained machine learning model 305 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observation and one or more prior observations (e.g., which may have previously been new observations input to the machine learning model and/or observations used to train the machine learning model), and/or the like, such as when unsupervised learning is employed.

In some implementations, the trained machine learning model 305 may predict a value of an azimuth angle for the target variable of determined viewpoint for the new observation, as shown by reference number 315. Based on this prediction (e.g., based on the value having a particular label/classification, based on the value satisfying or failing to satisfy a threshold, and/or the like), the machine learning system may output information, such as information identifying a type of vehicle detected in an image (e.g., car, truck, motorcycle, and/or the like), information identifying a make of a vehicle detected in an image, information identifying a location of the vehicle within the image, and/or the like. Additionally, or alternatively, the machine learning system may perform an automated action and/or may cause an automated action to be performed (e.g., by instructing another device to perform the automated action), such as providing a result output by the machine learning model to be input into another machine learning model, extracting the image of an object from the image, and/or the like. In some implementations, the recommendation and/or the automated action may be based on the target variable value having a particular label (e.g., classification, categorization, and/or the like), may be based on whether the target variable value satisfies one or more threshold (e.g., whether the target variable value is greater than a threshold, is less than a threshold, is equal to a threshold, falls within a range of threshold values, and/or the like), and/or the like.

In some implementations, the trained machine learning model 305 may classify (e.g., cluster) the new observation in a cluster, as shown by reference number 320. The observations within a cluster may have a threshold degree of similarity (e.g., associated with an object viewpoint estimation within a same range of azimuth angles). Based on classifying the new observation in the cluster, the machine learning system may provide information, such information indicating that the image includes multiple objects of a same type (e.g., multiple vehicles), information indicating that the image includes a single object of a particular type (e.g., a single vehicle), information indicating a classification associated with the object, and/or the like. Additionally, or alternatively, the machine learning system may perform an automated action and/or may cause an automated action to be performed (e.g., by instructing another device to perform the automated action), such as extracting an image of an object from the image, providing the image to another device, providing information identifying a location of an object within the image to another device, and/or the like.

In this way, the machine learning system may apply a rigorous and automated process to determining object viewpoint estimations. The machine learning system enables recognition and/or identification of tens, hundreds, thousands, or millions of features and/or feature values for tens, hundreds, thousands, or millions of observations, thereby increasing an accuracy and consistency of determining object viewpoint estimations relative to requiring computing resources to be allocated for tens, hundreds, or thousands of operators to manually determine object viewpoint estimations and/or to use another type of deep learning model to determine object viewpoint estimations using the features or feature values.

As indicated above, FIG. 3 is provided as an example. Other examples may differ from what is described in connection with FIG. 3.

Figure 4:
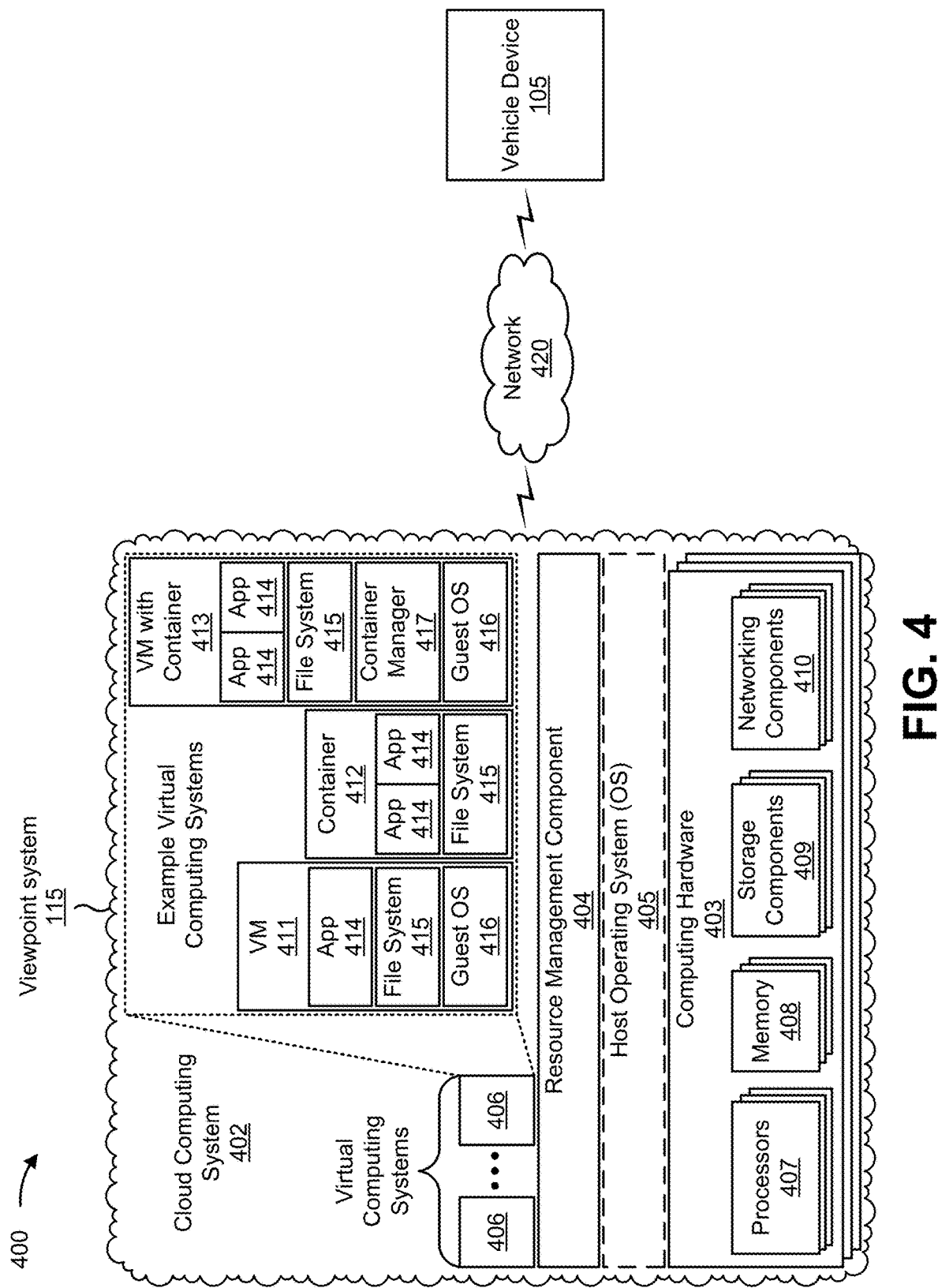
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a viewpoint system 115. The viewpoint system 115 may include one or more elements of a cloud computing system 402 and/or may execute within the cloud computing system 402 (e.g., as one or more virtual computing systems 406). The cloud computing system 402 may include one or more elements 403-417, as described in more detail below. As further shown in FIG. 4, environment 400 may include a network 420 and/or a vehicle device 105. Devices of environment 400 may interconnect via wired connections, wireless connections, or a combination of wired and wireless connections.

The cloud computing system 402 includes computing hardware 403, a resource management component 404, a host operating system (OS) 405, and/or one or more virtual computing systems 406. The resource management component 404 may perform virtualization (e.g., abstraction) of computing hardware 403 to create the one or more virtual computing systems 406. Using such virtualization, the resource management component 404 enables a single computing device (e.g., a computer, a server, a host device, and/or the like) to operate as if the single computing device were multiple computing devices, such as by creating multiple isolated virtual computing systems 406 from computing hardware 403 of the single computing device. The multiple virtual computing systems 406 operate independently from one another and do not interact with one another. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server or host device) or from multiple computing devices (e.g., multiple servers or host devices), such as multiple computing devices in one or more data centers, server farms, server pools, and/or the like. As shown, computing hardware 403 may include one or more processors 407, one or more memories 408, one or more storage components 409, and/or one or more networking components 410. Computing hardware 403 may be interconnected via one or more wired and/or wireless buses, which may interconnect computing hardware 403 within a single computing device and/or across multiple computing devices.

A processor 407 includes a central processing unit, a graphics processing unit, and/or the like. A memory 408 includes random access memory, read-only memory, and/or the like. The memory 408 may store a set of instructions (e.g., one or more instructions) for execution by the processor 407. The processor 407 may execute the set of instructions to perform one or more operations or processes described herein. In some implementations, execution of the set of instructions, by one or more processors 407, causes the one or more processors 407 and/or the viewpoint system 115 to perform one or more operations or processes described herein. A storage component 409 includes a hard disk or another type of storage device that stores information, data, and/or software (e.g., code, instructions, and/or the like) related to the operation and use of the viewpoint system 115. In some implementations, memory 408 and/or storage component 409 is/are implemented as a non-transitory computer readable medium. A networking component 410 includes a network interface and corresponding hardware that enables the viewpoint system 115 to communicate with other devices of environment 400 via a wired connection and/or a wireless connection, such as via network 420. Additional examples of a processor, a memory, a storage component, and a networking component (e.g., a communication interface) are described elsewhere herein.

The resource management component 404 includes a virtualization application (e.g., executing on hardware, such as computing hardware 403) capable of virtualizing computing hardware 403 to start (e.g., create or spin up), stop (e.g., delete or tear down), and/or manage one or more virtual computing systems 406. Such virtualization may include operating system virtualization, shared kernel virtualization (e.g., container-based virtualization), kernel level virtualization, hypervisor virtualization, paravirtualization, full virtualization, hardware virtualization, and/or the like. The resource management component 404 may control access to and/or use of computing hardware 403 and/or software executing on computing hardware 403. Additionally, or alternatively, the resource management component 404 may perform binary rewriting to scan instructions received from a virtual computing system 406 and replace any privileged instructions with safe emulations of those instructions. The resource management component 404 may include a hypervisor or a virtual machine monitor, such as when the virtual computing systems 406 are virtual machines 411. Additionally, or alternatively, the resource management component 404 may include a container manager, such as when the virtual computing systems 406 are containers 412.

In some implementations, the resource management component 404 executes within and/or in coordination with a host operating system 405. For example, the resource management component 404 may execute on top of the host operating system 405 rather than interacting directly with computing hardware 403, such as when the resource management component 404 is a hosted hypervisor (e.g., a Type 2 hypervisor) or a container manager. In this case, the host operating system 405 may control access to and/or use of computing hardware 403 and/or software executing on computing hardware 403 based on information and/or instructions received from the resource management component 404. Alternatively, the resource management component 404 may interact directly with computing hardware 403 rather than interacting with the host operating system 405, such as when the resource management component 404 is a bare-metal hypervisor (e.g., a Type 1 hypervisor). Thus, in some implementations, the cloud computing system 402 does not include a host operating system 405. In some implementations, the host operating system 405 includes and/or executes an administrator application to enable a system administrator to manage, customize, and/or configure cloud computing system 402.

A virtual computing system 406 includes a virtual environment that enables cloud-based execution of operations and/or processes described herein using computing hardware 403. As shown, a virtual computing system 406 may include a virtual machine 411, a container 412, a hybrid environment 413 that includes a virtual machine and a container, and/or the like. A virtual computing system 406 may execute one or more applications 414 using a file system 415. The file system 415 may include binary files, software libraries, and/or other resources required to execute applications 414 on a guest operating system 416 or the host operating system 405. In some implementations, a virtual computing system 406 (e.g., a virtual machine 411 or a hybrid environment 413) includes a guest operating system 416. In some implementations, a virtual computing system 406 (e.g., a container 412 or a hybrid environment 413) includes a container manager 417.

A virtual machine 411 is an emulation of a computing device that enables execution of separate, isolated instances of virtual computing devices (e.g., multiple virtual machines 411) on the same computing hardware 403. The guest operating systems 416 and applications 414 of multiple virtual machines 411 may share computing hardware 403 from a single computing device or from multiple computing devices (e.g., a pool of computing devices). Each separate virtual machine 411 may include a guest operating system 416, a file system 415, and one or more applications 414. With a virtual machine 411, the underlying computing hardware 403 is virtualized, and the guest operating system 416 executes on top of this virtualized hardware. Using virtual machines 411 enables different types of guest operating systems 416 to execute on the same computing hardware 403 in an isolated environment, but with more resource usage and overhead than containers 412.

Unlike a virtual machine 411, a container 412 virtualizes a host operating system 405 rather than the underlying computing hardware 403. Thus, a container 412 does not require a guest operating system 416 because the application(s) 414 included in the container 412 execute directly on the host operating system 405 using a file system 415 included in the container 412. Each separate container 412 may share the kernel of the host operating system 405, and different applications 414 within a single container 412 may share a file system 415. This sharing of a file system 415 among multiple applications 414 reduces the need to reproduce operating system code for different applications, and enables a single host operating system 405 to execute multiple applications 414 and/or containers 412. As a result, containers 412 enable a greater quantity of applications 414 to execute on a smaller quantity of computing devices as compared to virtual machines 411.

A hybrid environment 413 includes elements of a virtual machine 411 and a container 412. For example, a hybrid environment 413 may include a guest operating system 416 that executes on top of virtualized hardware. A container manager 417 may execute on top of the guest operating system 416 to start, stop, and/or manage one or more containers within the hybrid environment 413. Using a hybrid environment 413 enables different types of guest operating systems 416 to execute on the same computing hardware 403 in an isolated environment, while also enabling lightweight containers to execute on top of the guest operating system 416.

The quantity of applications 414 shown in FIG. 4 as executing within each virtual computing system 406 is shown as an example, and a different quantity of applications 414 may execute within each virtual computing system. Furthermore, although the viewpoint system 115 may include one or more elements 403-417 of the cloud computing system 402, may execute within the cloud computing system 402, and/or may be hosted within the cloud computing system 402, in some implementations, the viewpoint system 115 may not be cloud-based (e.g., may be implemented outside of a cloud computing system) or may be partially cloud-based. For example, the viewpoint system 115 may include one or more devices that are not part of the cloud computing system 402, such as device 500 of FIG. 5, which may include a standalone server or another type of computing device. The viewpoint system 115 may perform one or more operations and/or processes described in more detail elsewhere herein.

Network 420 includes one or more wired and/or wireless networks. For example, network 420 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 420 enables communication among the devices of environment 400.

The vehicle device 105 includes one or more devices capable of receiving, generating, storing, processing, and/or providing information, such as information described herein. For example, vehicle device 105 may include a device included in a vehicle (e.g., vehicle 110) for obtaining image data associated with the vehicle traveling along a route. For example, vehicle device 105 may include a video camera, a dash camera, a parking assist camera, a backup assist camera, a thermal camera, lidar, radar, and/or the like. In some implementations, vehicle device 105 may include a device for obtaining other types of data associated with the vehicle 110 traveling along a route. For example, vehicle device 105 may include an inertial measurement unit, a three-axis accelerometer, a gyroscope, a global positioning system (GPS) device, an OBD device, an ECU, and/or the like.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
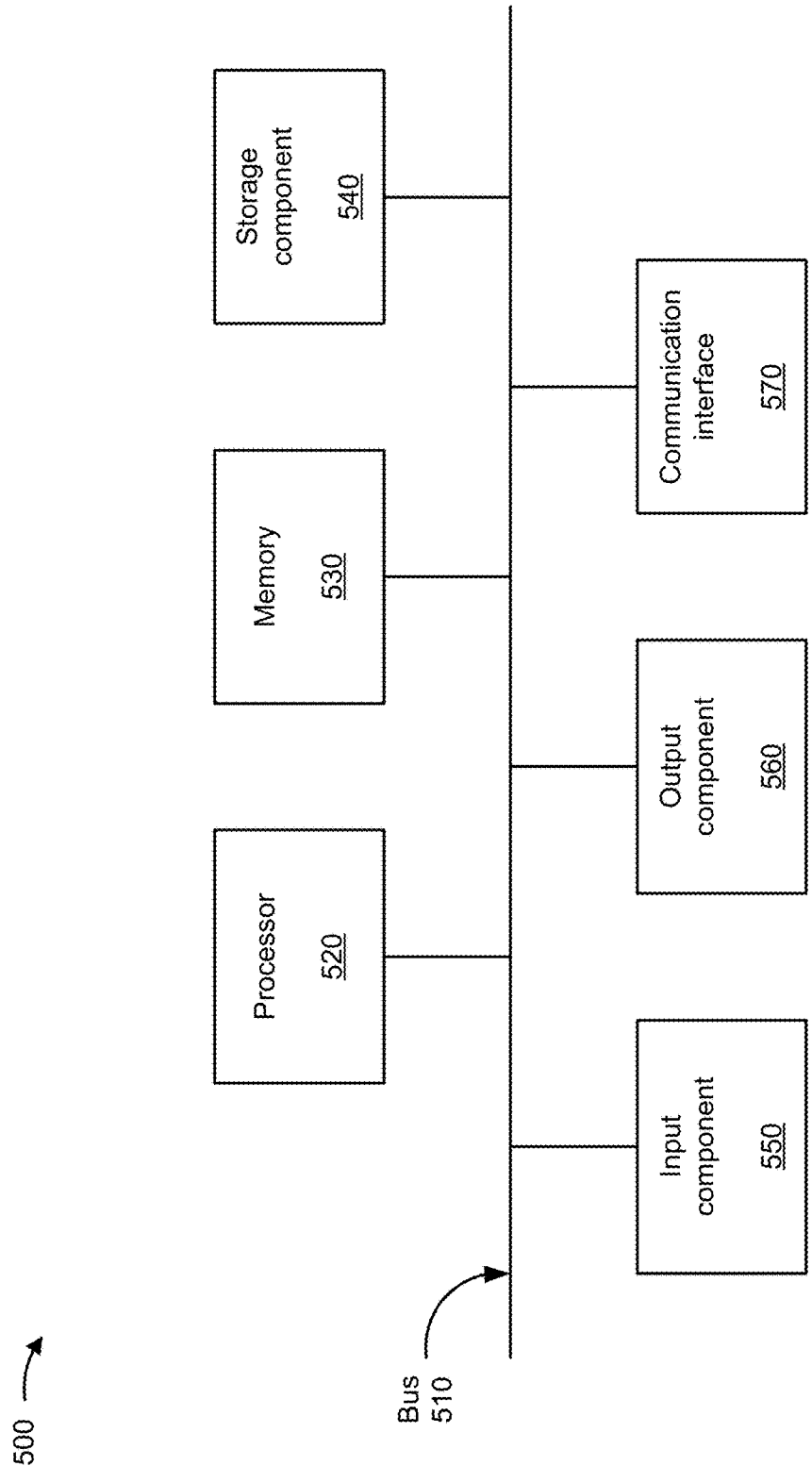
FIG. 5 is a diagram of example components of one or more devices of FIG. 4.

FIG. 5 is a diagram of example components of a device 500. Device 500 may correspond to viewpoint system 115 and/or vehicle device 105. In some implementations, viewpoint system 115 and/or vehicle device 105 may include one or more devices 500 and/or one or more components of device 500. As shown in FIG. 5, device 500 may include a bus 510, one or more processor(s) 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more LEDs).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, an RF interface, a universal serial bus (USB) interface, a wireless local area interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
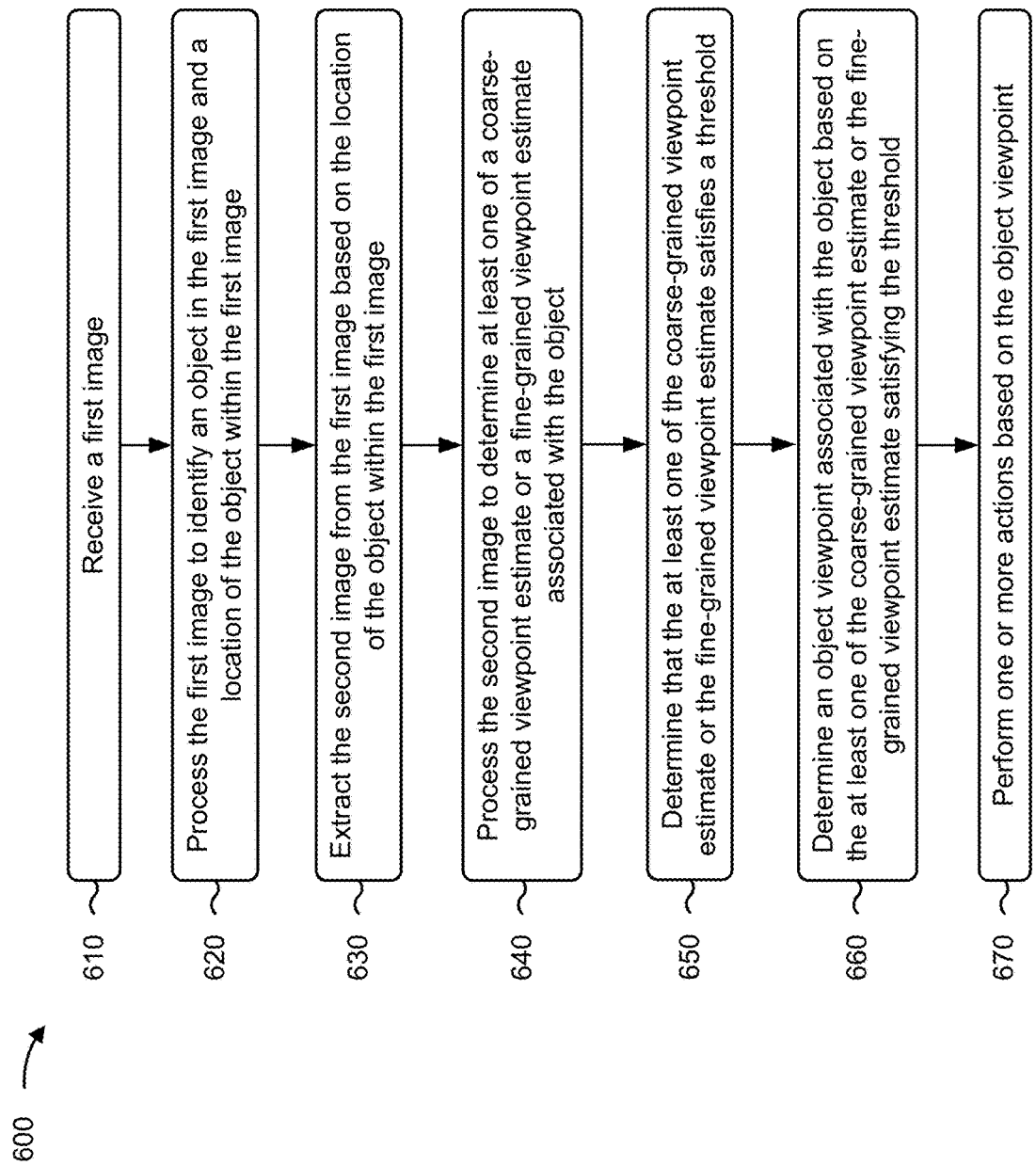
FIG. 6 is a flow chart of an example process relating to utilizing a deep learning model to determine vehicle viewpoint estimations.

FIG. 6 is a flow chart of an example process 600 for relating to utilizing a deep learning model to determine vehicle viewpoint estimations. In some implementations, one or more process blocks of FIG. 6 may be performed by a device (e.g., viewpoint system 115). In some implementations, one or more process blocks of FIG. 6 may be performed by another device or a group of devices separate from or including the device, such as vehicle device 105 and/or the like. Additionally, or alternatively, one or more process blocks of FIG. 6 may be performed by one or more components of a device 300, such as processor 520, memory 530, storage component 540, input component 550, output component 560, communication interface 570, and/or the like.

As shown in FIG. 6, process 600 may include receiving a first image (block 610). For example, the device may receive a first image, as described above. The device may receive the first image from a vehicle device of a vehicle. The vehicle device may include a single dash camera provided in the vehicle.

As further shown in FIG. 1, process 600 may include processing the first image to identify an object in the first image and a location of the object within the first image (block 620). For example, the device may process the first image to identify an object in the first image and a location of the object within the first image, as described above. In some implementations, the device may use an object detection model to process the first image. The object detection model may include one or more of a "you only look once model", "a single-shot detector model", or a "faster region convolutional neural network model".

As further shown in FIG. 6, process 600 may include extracting the second image from the first image based on the location of the object within the first image (block 630). For example, the device may extract the second image from the first image based on the location of the object within the first image, as described above.

As further shown in FIG. 6, process 600 may include processing the second image to determine at least one of a coarse-grained viewpoint estimate or a fine-grained viewpoint estimate associated with the object (block 640). For example, the device may process the second image to determine a coarse-grained viewpoint estimate or a fine-grained viewpoint estimate associated with the object, as described above. The coarse-grained viewpoint estimate may be associated with a first range of azimuth angles. The fine-grained viewpoint estimate may be associated with a second range of azimuth angles that is less than the first range of azimuth angles.

In some implementations, the device may process the second object with a deep learning model. The deep learning model may include one or more of a convolutional neural network model, a Siamese neural network model, or a combination of a convolutional neural network model and a Siamese neural network model. Process 600 may include training the deep learning model, based on the image data and a Siamese technique, to generate a trained deep learning model.

The deep learning model may be trained based on image data identifying driving scenes captured by vehicle devices at different positions in vehicles.

Process 600 may include applying, prior to training the deep learning model, random horizontal flipping to images of the image data; and normalizing, prior to training the deep learning model, the images of the image data by subtracting a mean and dividing by a standard deviation of the image data. In some implementations, the deep learning model determines a plurality of coarse-grained viewpoint estimates and a plurality of fine-grained viewpoint estimates.

In some implementations, processing the second image comprises providing an output of the object detection model as an input to a neural network portion of the deep learning model, and determining the coarse-grained viewpoint and the fine-grained viewpoint based on an output of the neural network portion of the deep learning model.

In some implementations, processing the second image further comprises providing the output of the neural network portion of the deep learning model to a pooling layer of the deep learning model and the coarse-grained viewpoint and the fine-grained viewpoint may be determined based on an output of the pooling layer.

Alternatively, and/or additionally, processing the second image may comprise processing the second image to determine a series of probabilities; grouping the series of probabilities into a first quantity of groups; determining the coarse-grained viewpoint estimate based on grouping the series of probabilities into the first quantity of groups; grouping the series of probabilities into a second quantity of groups, the second quantity is greater than the first quantity, and determining the fine-grained viewpoint estimate based on grouping the series of probabilities into the second quantity of groups.

As further shown in FIG. 6, process 600 may include determining that the at least one of the coarse-grained object viewpoint estimate or the fine-grained object viewpoint estimate satisfies a threshold (block 650). For example, the device may determine that the at least one of the coarse-grained object viewpoint estimate or the fine-grained object viewpoint estimate satisfies a threshold, as described above.

As further shown in FIG. 6, process 600 may include determining an object viewpoint associated with the object based on the at least one of the coarse-grained viewpoint estimate or the fine-grained viewpoint estimate (block 660). For example, the device may determine an object viewpoint associated with the object based on at least one of the coarse-grained viewpoint estimate or the fine-grained viewpoint estimate, as described above.

In some implementations, determining the object viewpoint comprises determining that an accuracy associated with the fine-grained viewpoint estimate satisfies the threshold, and determining the object viewpoint based on the fine-grained viewpoint estimate based on the fine-grained viewpoint estimate satisfying the threshold.

Alternatively, and/or additionally, determining the object viewpoint may comprise determining a first confidence level associated with the coarse-grained viewpoint estimate and a second confidence level associated with the fine-grained viewpoint estimate; determining that the first confidence level satisfies a threshold; determining that the second confidence level fails to satisfy a threshold; and determining the object viewpoint based on the coarse-grained viewpoint estimate based on the first confidence level satisfying the threshold and based on the second confidence level failing to satisfy the threshold.

In some implementations, process 600 may include determining that an accuracy associated with a fine-grained viewpoint estimate, of one or more fine-grained viewpoint estimates determined by the deep learning model, satisfies a threshold; and determining that a granularity associated with the fine-grained viewpoint estimate is a finer granularity relative to other fine-grained viewpoint estimates, of the one or more fine-grained viewpoint estimates, and a granularity of one or more coarse-grained viewpoint estimates determined by the deep learning model. The object viewpoint may be determined based on the fine-grained viewpoint estimate based on the accuracy information associated with the fine-grained viewpoint estimate satisfying the threshold and the granularity associated with the fine-grained viewpoint estimate being the finer granularity.

Process 600 may include determining a direction an object (e.g., a vehicle) is facing based on the object viewpoint.

As further shown in FIG. 6, process 600 may include performing one or more actions based on the object viewpoint (block 670). For example, the device may perform one or more actions based on the object viewpoint, as described above. Performing the one or more actions may include providing information identifying the object viewpoint to a vehicle.

Process 600 may further include determining, based on the object viewpoint, a direction of travel associated with the object.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:
1. A method comprising:
receiving, by a device, a first image;
processing, by the device, the first image to identify an object in the first image and a location of the object within the first image;
extracting, by the device, a second image from the first image based on the location of the object within the first image;
processing, by the device, the second image to determine at least one of a coarse-grained viewpoint estimate or a fine-grained viewpoint estimate associated with the object,
wherein the coarse-grained viewpoint estimate, of the at least one of the coarse-grained viewpoint estimate, is associated with a first range of azimuth angles, and the fine-grained viewpoint estimate, of the at least one of the fine-grained viewpoint estimate, is associated with a second range of azimuth angles that is less than the first range of azimuth angles;
determining, by the device, that the at least one of the coarse-grained viewpoint estimate or the fine-grained viewpoint estimate satisfies a threshold;
determining, by the device, an object viewpoint associated with the object based on the at least one of the coarse-grained viewpoint estimate or the fine-grained viewpoint estimate satisfying the threshold; and performing, by the device, one or more actions based on the object viewpoint.

2. The method of claim 1, wherein processing the second image comprises:

processing the second image to determine a series of probabilities;

grouping the series of probabilities into a first quantity of groups;

determining the coarse-grained viewpoint estimate based on grouping the series of probabilities into the first quantity of groups;

grouping the series of probabilities into a second quantity of groups,
wherein the second quantity of groups is greater than the first quantity of groups; and determining the fine-grained viewpoint estimate based on grouping the series of probabilities into the second quantity of groups.

3. The method of claim 1, wherein processing the second image comprises:

providing an output of an object detection model as an input to a neural network portion of a deep learning model; and determining the coarse-grained viewpoint estimate and the fine-grained viewpoint estimate based on an output of the neural network portion of the deep learning model.

4. The method of claim 3, wherein processing the second image further comprises:

providing the output of the neural network portion of the deep learning model to a pooling layer of the deep learning model,
wherein the coarse-grained viewpoint estimate and the fine-grained viewpoint estimate are determined based on an output of the pooling layer.

5. The method of claim 1, wherein processing the first image comprises:

processing the first image with an object detection model to identify the object in the first image and a bounding box corresponding to the location of the object within the first image.

6. The method of claim 1, wherein performing the one or more actions comprises:

providing information identifying the object viewpoint to an autonomous driving system of a vehicle.

7. The method of claim 3, wherein the deep learning model includes one or more of:

a convolutional neural network model, a Siamese neural network model, or a combination of the convolutional neural network model and the Siamese neural network model.

8. A device, comprising:

one or more processors configured to:

normalize, prior to training a deep learning model, images of image data by subtracting a mean and dividing by a standard deviation of the image data;

train the deep learning model based on applying random horizontal flipping and applying a Siamese network to the images of the image data;

receive, from a vehicle device of a first vehicle, a first image;

process the first image to identify an object in the first image and a location of the object within the first image;

extract, from the first image, a second image based on the location of the object within the first image;

process the second image, utilizing the deep learning model, to determine a coarse-grained viewpoint estimate and a fine-grained viewpoint estimate for the object;

determine that at least one of the coarse-grained viewpoint estimate or the fine-grained viewpoint estimate satisfies a threshold confidence level;

determine an object viewpoint associated with the object based on the at least one of the coarse-grained viewpoint estimate or the fine-grained viewpoint estimate; and perform one or more actions based on the object viewpoint.

9. The device of claim 8, wherein the first image is processed using an object detection model, and wherein the object detection model includes one or more of:

a you only look once model, a single-shot detector model, or a faster region convolutional neural network model.

10. The device of claim 8, wherein the vehicle device includes a single dash camera provided in the vehicle.

11. The device of claim 8, wherein the one or more processors, when determining that the at least one of the coarse-grained viewpoint estimate or the fine-grained viewpoint estimate satisfies the threshold confidence level, are further configured to:

determine a first confidence level associated with the coarse-grained viewpoint estimate and a second confidence level associated with the fine-grained viewpoint estimate;

determine that the first confidence level satisfies the threshold confidence level; and determine that the second confidence level fails to satisfy the threshold confidence level,
wherein the object viewpoint is determined based on the coarse-grained viewpoint estimate based on the first confidence level satisfying the threshold and based on the second confidence level failing to satisfy the threshold.

12. The device of claim 8, wherein the object comprises a vehicle, and wherein the one or more processors are configured further to:

determine, based on the object viewpoint, a direction of travel associated with the vehicle.

13. The device of claim 8, wherein:

the coarse-grained viewpoint estimate is associated with a first range of azimuth angles, and the fine-grained viewpoint estimate is associated with a second range of azimuth angles that is less than the first range of azimuth angles.

14. The device of claim 8, wherein the one or more one or more processors, to process the second image, are to:

provide an output of an object detection model as an input to a neural network portion of a deep learning model; and determine the coarse-grained viewpoint estimate and the fine-grained viewpoint estimate based on an output of the neural network portion of the deep learning model.

15. A non-transitory computer-readable medium storing instructions, the instructions comprising:

one or more instructions that, when executed by one or more processors, cause the one or more processors to:

receive, from a vehicle device of a vehicle, a first image;

process the first image, with an object detection model, to identify an object in the first image and a location of the object within the first image;

extract, from the first image, a second image of the object based on the location of the object within the first image;

process the second image, with a deep learning model, to determine one or more coarse-grained viewpoint estimates and one or more fine-grained viewpoint estimates associated with the object;

determine an object viewpoint associated with the object based on the one or more coarse-grained viewpoint estimates or the one or more fine-grained viewpoint estimates;

provide information identifying the object viewpoint to the vehicle; and determine that an accuracy associated with the one or more fine-grained viewpoint estimates fails to satisfy a threshold, wherein the object viewpoint is determined based on a course-grained viewpoint estimate of the one or more coarse-grained viewpoint estimates and based on the accuracy associated with the one or more fine-grained viewpoint estimates failing to satisfy the threshold.

16. The non-transitory computer-readable medium of claim 15, wherein the one or more coarse-grained viewpoint estimates include a plurality of coarse-grained viewpoint estimates and the one or more fine-grained viewpoint estimates include a plurality of fine-grained viewpoint estimates.

17. The non-transitory computer-readable medium of claim 15, wherein the one or more instructions, when executed by the one or more processors, further cause the one or more processors to:

determine a direction that the object is facing based on the object viewpoint.

18. The non-transitory computer-readable medium of claim 15, wherein the one or more instructions, when executed by the one or more processors, further cause the one or more processors to:

determine that the accuracy associated with a fine-grained viewpoint estimate, of the one or more fine-grained viewpoint estimates, satisfies a threshold; and determine that a granularity associated with the fine-grained viewpoint estimate is a finer granularity relative to other fine-grained viewpoint estimates, of the one or more fine-grained viewpoint estimates, and a granularity of the one or more coarse-grained viewpoint estimates, wherein the object viewpoint is determined as the fine-grained viewpoint estimate based on the accuracy associated with the fine-grained viewpoint estimate satisfying the threshold and the granularity associated with the fine-grained viewpoint estimate being the finer granularity.

19. The non-transitory computer-readable medium of claim 15, wherein:

a coarse-grained viewpoint estimate, of the one or more coarse-grained viewpoint estimates, is associated with a first range of azimuth angles, and a fine-grained viewpoint estimate, of the one or more fine-grained viewpoint estimates, is associated with a second range of azimuth angles that is less than the first range of azimuth angles.

20. The non-transitory computer-readable medium of claim 15, wherein the one or more instructions, that cause the one or more processors to process the second image, cause the one or more processors to:

provide an output of an object detection model as an input to a neural network portion of a deep learning model; and determine the coarse-grained viewpoint estimate and the fine-grained viewpoint estimate based on an output of the neural network portion of the deep learning model.

* * * * *